(12) United States Patent
Schirano

(10) Patent No.: US 12,085,396 B2
(45) Date of Patent: *Sep. 10, 2024

(54) UNIFIED BOOKING AND STATUS FOR MULTI-MODAL TRANSPORT

(71) Applicant: Uber Technologies, Inc., San Francisco, CA (US)

(72) Inventor: Pietro Schirano, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/810,180

(22) Filed: Jun. 30, 2022

(65) Prior Publication Data

US 2022/0333936 A1 Oct. 20, 2022

Related U.S. Application Data

(63) Continuation of application No. 16/822,807, filed on Mar. 18, 2020, now Pat. No. 11,408,743.

(60) Provisional application No. 62/820,074, filed on Mar. 18, 2019.

(51) Int. Cl.
*G01C 21/34* (2006.01)
*G01C 21/36* (2006.01)
*G06Q 10/02* (2012.01)
*G06Q 50/40* (2024.01)

(52) U.S. Cl.
CPC ....... *G01C 21/3423* (2013.01); *G01C 21/343* (2013.01); *G01C 21/3676* (2013.01); *G06Q 10/02* (2013.01); *G06Q 50/40* (2024.01)

(58) Field of Classification Search
CPC .............. G01C 21/3423; G01C 21/343; G01C 21/3676; G06Q 10/02; G06Q 50/30
See application file for complete search history.

(56) References Cited

U.S. PATENT DOCUMENTS

| 11,408,743 B2 | 8/2022 | Schirano | |
|---|---|---|---|
| 2008/0189148 A1* | 8/2008 | Diaz | G06Q 10/02 705/6 |
| 2010/0305984 A1* | 12/2010 | Ben-Yitschak | G06Q 10/025 707/769 |

(Continued)

OTHER PUBLICATIONS

"U.S. Appl. No. 16/822,807, Notice of Allowance mailed Apr. 6, 2022", 8 pgs.

(Continued)

*Primary Examiner* — Rami Khatib
(74) *Attorney, Agent, or Firm* — Schwegman Lundberg & Woessner, P.A.

(57) ABSTRACT

User interfaces for booking and tracking of multi-modal itineraries are disclosed. In some aspects, a mobile device application provides a unified user interface for both booking and status tracking of a multi-modal transportation service including different travel modalities. For example, a first leg of the multi-modal transportation service may include ground-based travel (such as travel via bus, train, walking, or car), and a second leg including aerial travel. Status of the trip may be displayed in each of the legs of the multi-modal transportation service to maintain traveler awareness across the multiple modes of travel and provide for improved ease of use when compared to conventional solutions.

20 Claims, 21 Drawing Sheets

(56) References Cited

U.S. PATENT DOCUMENTS

2015/0294237 A1* 10/2015 Stener .................. G06Q 10/02
                                                    705/5
2020/0300645 A1   9/2020 Schirano
2021/0270617 A1*  9/2021 Spielman .......... G01C 21/3423
2022/0011133 A1*  1/2022 Efland ................. G01C 21/20

OTHER PUBLICATIONS

Uber, "Fast-Forwarding to a Future of On-Demand Urban Air Transportation Introduction", Uber Elevate, <URL:https://www.uber.com/elevate.pdf> [retrieved on Nov. 26, 2018], (Oct. 27, 2016), 98 pgs.

* cited by examiner

UNIFIED BOOKING AND STATUS FOR MULTI-MODAL TRANSPORT

CROSS REFERENCE TO RELATED APPLICATIONS

This application is a continuation of U.S. application Ser. No. 16/822,807, filed Mar. 18, 2020, which claims priority to U.S. Provisional Application No. 62/820,074, filed Mar. 18, 2019 and entitled "Unified Booking and Status for Multi-Modal Transport." The contents of each of which is considered part of this application, and is hereby incorporated by reference in their entireties.

FIELD

This document pertains generally, but not by way of limitation, to devices, systems, and methods for managing travel within a multi-modal travel system.

BACKGROUND

Travel applications have been developed to book and/or manage travel using a single mode. For example, applications exist to book a flight on an airplane, or to book a ride in a vehicle. These applications may provide some capabilities to, for example, check in for a flight, or monitor status of a ride in a vehicle. However, many trips involve multiple forms or modes of transportation. For example, an individual may drive to a train station, take a train to a destination station, and then take a taxi or rental car to a final destination. Therefore, improved solutions for assisting travelers with complex itineraries are desired.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1A:
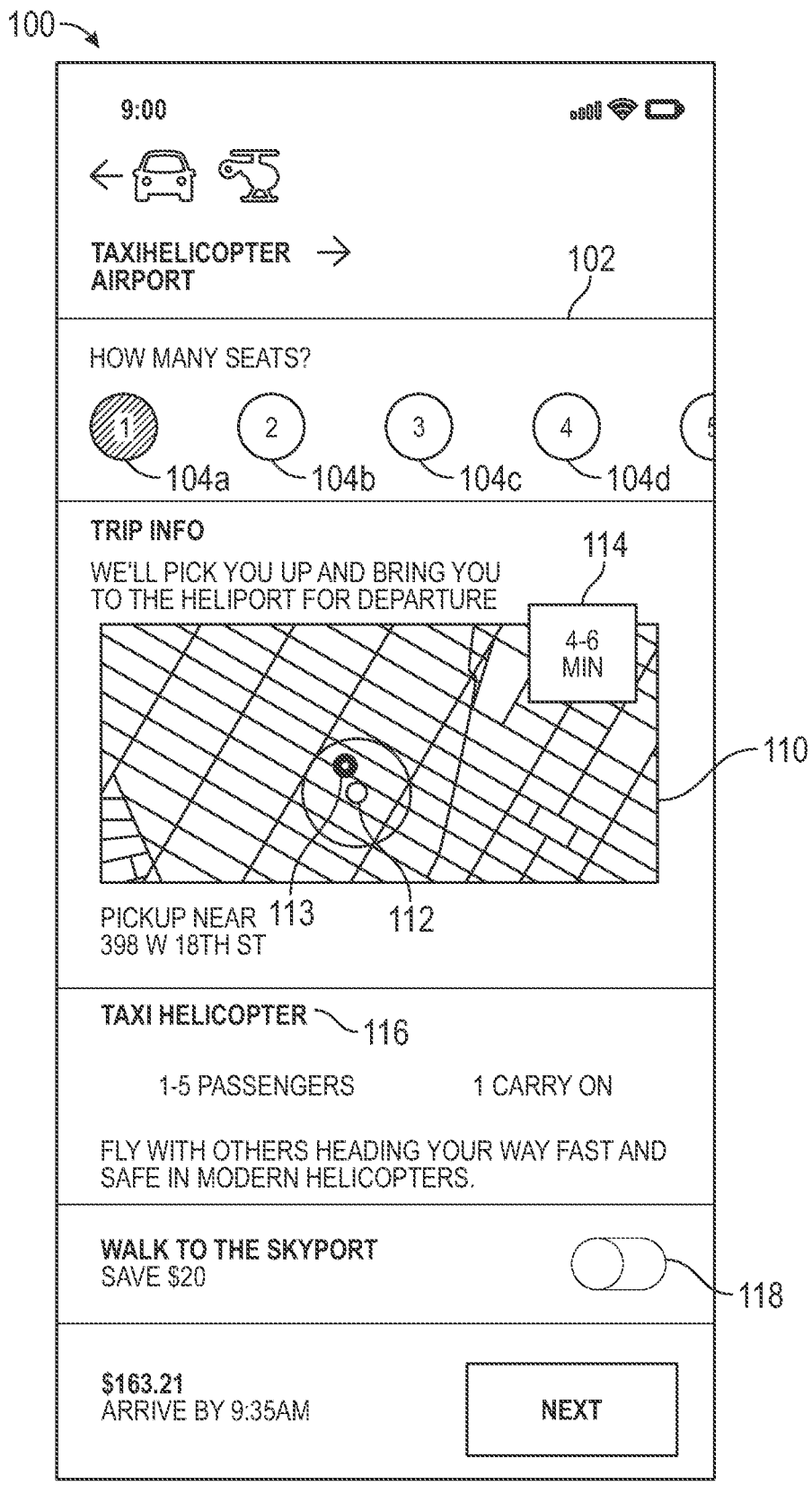
FIG. 1A shows an example of a user interface, all or a portion of which is implemented by one or more of the disclosed embodiments.

Existing solutions for facilitating travel typically provide an ability to book travel using a single mode of travel. For example, using a number of different popular web sites, airline flights from an origin location to a destination location can be booked. These sites do not provide for booking of travel using other forms of travel (e.g. bus, train, car, shuttle, or other forms of transportation). Frequently, a user is forced to coordinate booking across several web sites when their planned trip includes multiple modes of transportation. Furthermore, sites or applications that provide for booking of travel do not provide an integrated user experience during the trip itself. Instead, the travel experience is typically augmented via a variety of different solutions based on the vendor providing a particular segment or leg of a trip. When transitioning from a first leg of the trip to a second leg of the trip, the user is required to switch from one application for the first leg (provided by a first vendor) to a second application for the second leg (provide by a second vendor). Thus, a user attempting to book and manage a multi-modal trip is presented with a technical problem by being forced to coordinate between multiple different applications that each use different user interface designs. Thus, the technical problem presented by a lack of a unified application that provides both booking and travel status information via a consistent integrated user interface causes the user experience associated with travel, and especially with multi-modal travel, to be difficult and time consuming.

Disclosed are embodiments that solve this technical problem via a unified travel management solution. The embodiments provide a single application configured to provide both booking of a multi-modal transportation service, via a multi-modal transportation service management application "booking" mode, and also to obtain travel status via a "status" mode of the application. These two modes of the application are integrated to provide a unified user interface across the multiple modes. Some of the disclosed embodiments are embodied within a mobile device application. The mobile device application operates using a full screen interface in at least some embodiments.

To book a multi-modal transportation service, a user interacts with user interfaces included in a "booking" mode of the multi-modal transportation service management application. The multi-modal transportation service multi-modal transportation service management application prompts to receive input indicating a time at which a user prefers to arrive at their destination. In some embodiments, at least two options are available for generating itineraries to support the received arrival time indication. A first option generates trip itineraries that provide for an arrival closest to the requested time. In other words, the first option prioritizes, in at least some embodiments, meeting the received arrival time above all other considerations. A second option generates trips that seek to both provide for an arrival near the received time, but also present trip options that consider other variables, such as cost, total trip elapsed time, quality of trip experience, or other factors.

The multi-modal transportation service management application is configured to display itineraries for multi-modal transportation services in their entirety, detailing time periods for each mode of the trip, whether it be via car, bus, train, air, taxi, walking, scooter, or other modes.

In some embodiments, when a current time is within a predetermined threshold time before a trip begins, the application transitions, in at least some embodiments, from the booking mode into the status mode which provides a different set of user interfaces than the booking mode. In some embodiments, once in the status mode, it may not be possible to book any additional trips in the application. Instead, only options to cancel or change the upcoming multi-modal transportation service, or view multi-modal transportation service status information is available in some embodiments.

While in the status mode, the travel management application is configured to present status relative to each leg of a planned trip. For example, in some aspects, a trip modality indicator is displayed linearly within a user interface. The trip modality indicator includes, in some embodiments, one or more graphical elements, each denoting a present leg and/or present leg status. The status mode also communicates, in at least some embodiments, any changes to the multi-modal transportation service as it occurs. For example, if one leg of the multi-modal transportation service is running ahead or behind schedule, effects on any subsequent legs are also displayed in some embodiments of the trip status mode.

By integrating booking and status of a multi-modal transportation service, a user's experience is enhanced by providing a single integrated user interface for booking and status. With respect to the status mode of the application, the disclosed embodiments further provide for improved situational awareness of the trip while it progresses through different legs of the multi-modal transportation service, with each status display customized for the particular mode of travel being used on the particular leg.

The example user interfaces described below are displayed, in at least some embodiments, based on data provided by a multi-modal transportation service management application. The multi-modal transportation service management application is configured, in at least some embodiments, to run on a variety of computing platforms, such as a mobile device, laptop, desktop computer, or other computing device. The user interfaces described in FIGS. 1-17 below are discussed with respect to a multi-modal transportation service. The example multi-modal transportation service includes three legs. Each leg utilizes a different type of vehicle to accomplish the leg. For example, both ground-based vehicles and aerial vehicles are illustrated. A leg of a trip may be considered a portion of a multi-modal transportation service that moves one or more travelers associated with the multi-modal transportation service from a first location (e.g. source location) to a second location (e.g. destination location) for the respective leg. A destination location for a first leg of the multi-modal transportation service can be a source location for a subsequent second leg of the multi-modal transportation service. Each leg of a trip includes one or more activities. For example, a leg of a trip utilizing a ground-based vehicle includes, in at least some embodiments, a first activity to wait for the car to pick up the traveler, then a travel activity, then an arrival activity. This is just an example, and a leg is not limited to this number or type of activities.

FIG. 1A shows an example user interface, all or a portion of which is implemented by one or more of the disclosed embodiments. FIG. 1A shows a user interface 100 that includes a seat selector 102 that is configured to allow selection of a number of seats for a multi-modal transportation service. As shown in the example of FIG. 1A, the seat selector 102 is configured to display multiple selectable elements 104*a-d* arranged along a horizontal dimension. The user interface 100 also displays a map 110, showing a pick-up location 112 for the trip and a present location of the user 113. The user interface 100 also displays an estimated elapsed time 114 (from a present time) before travelers of the trip are picked up at the pick-up location 112. A travel modality indicator 116 is also shown in the user interface 100. The travel modality indicator 116 indicates a type of vehicle that will be utilized for the multi-modal transportation service. The travel modality indicator 116 is configured to display at least two different travel modalities. Each of the at least two different travel modalities include at least two travel legs or segments of a multi-modal trip.

Figure 1B:
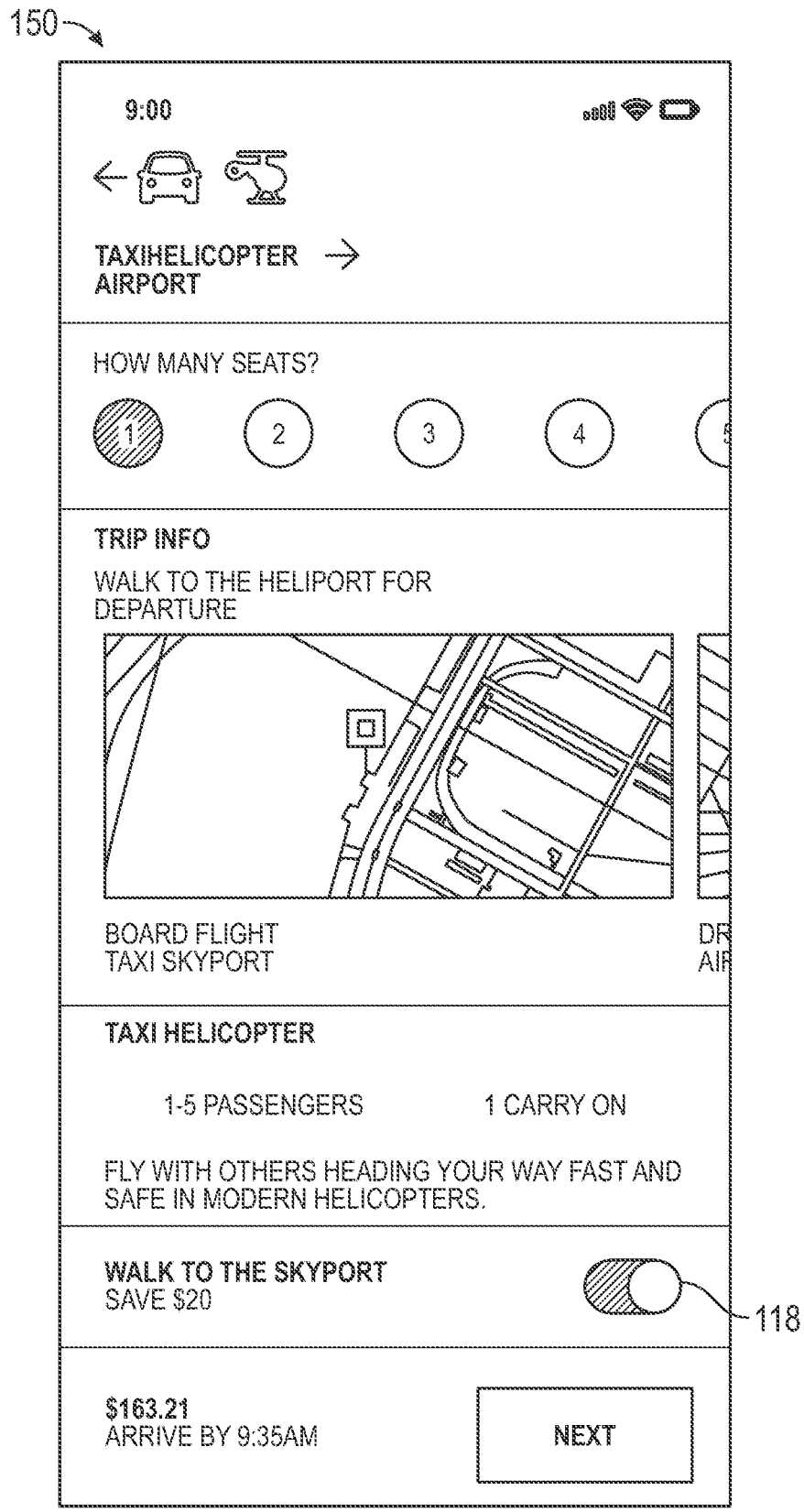
FIG. 1B shows a variation of the example user interface of FIG. 1A.

The user interface 100 also includes a selectable control 118 that provides for a traveler of the multi-modal transportation service to walk for a portion of the multi-modal transportation service. For example, the user interface 100 illustrates that the selectable control 118 allows a traveler to indicate they will walk to a sky port before taking a ride on a helicopter. In the user interface 100, the selectable control 118 is positioned such that walking is not selected. A variation of the user interface 100 is shown in FIG. 1B as user interface 150, which shows the selectable control 118 selected such that walking to the sky port is selected.

Figure 2:
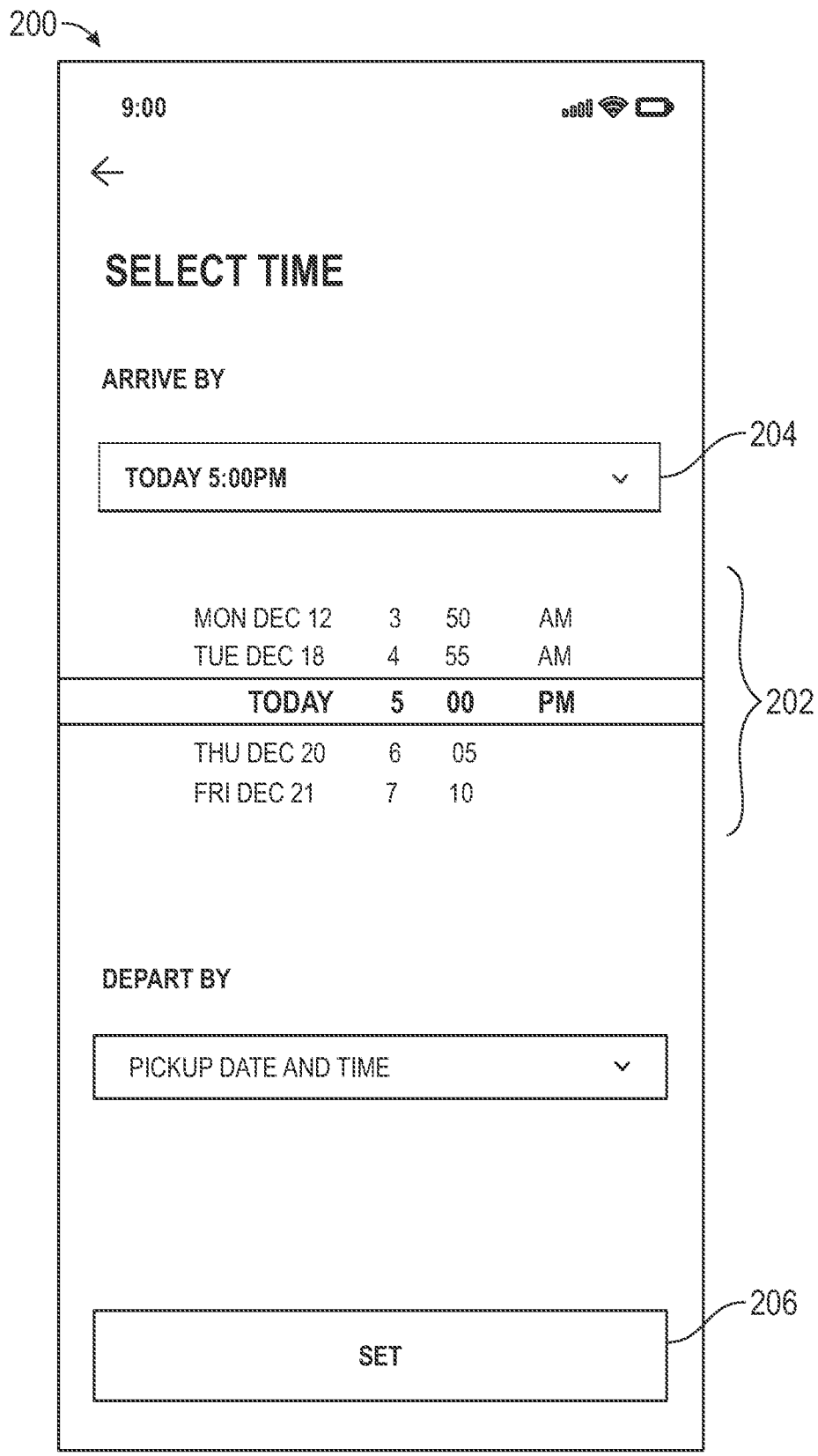
FIG. 2 shows an example of a user interface, all or a portion of which is implemented in one or more of the disclosed embodiments

FIG. 2 shows an example user interface, all or a portion of which is implemented in one or more of the disclosed embodiments. The user interface 200 of FIG. 2 provides for selection of an arrival time at a destination location via a scrollable time control 202. The arrival time is alternatively selected via a drop-down control 204 in some embodiments. A selectable control 206 provides for setting of the selected arrival time.

Figure 3:
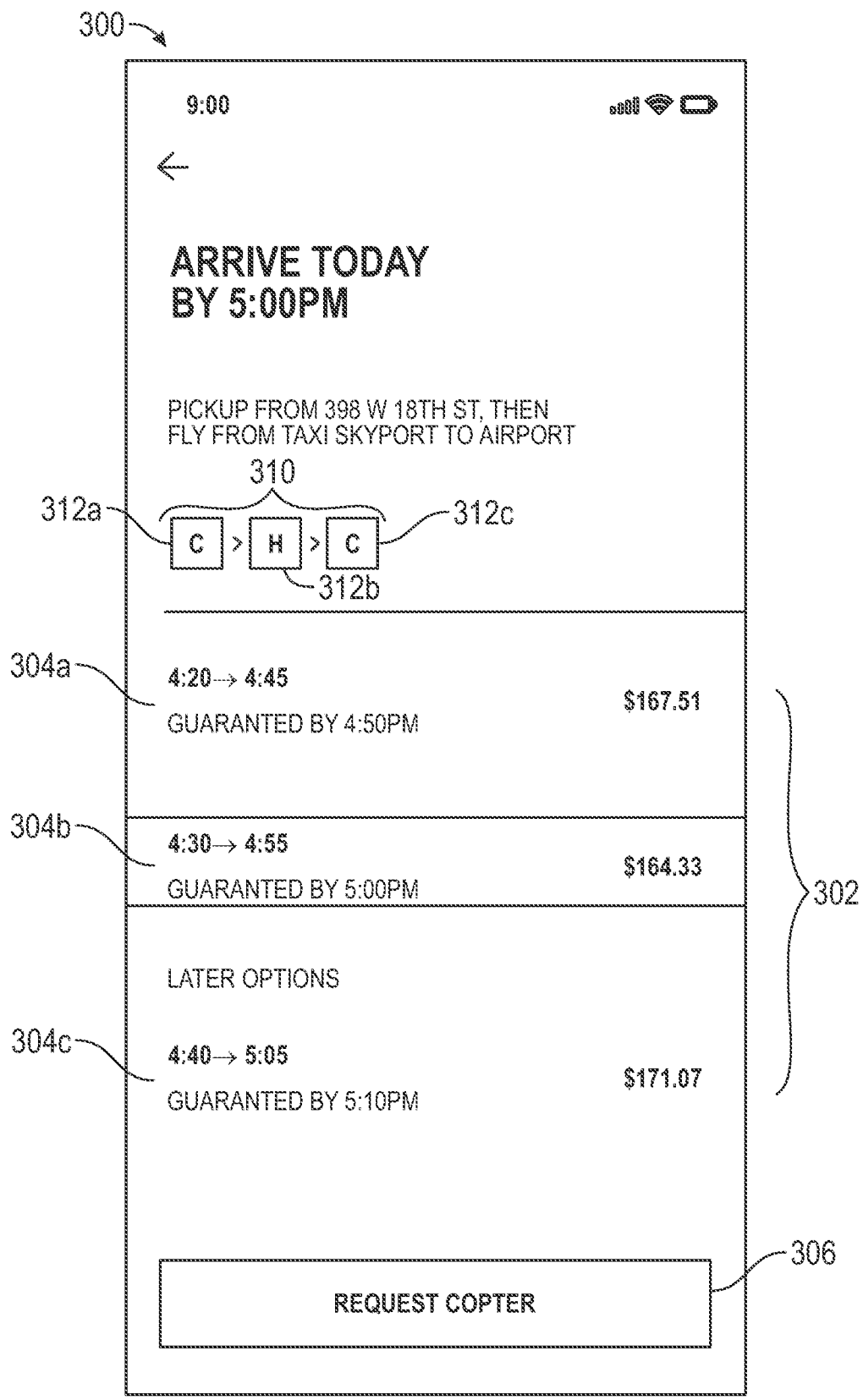
FIG. 3 shows an example of a user interface, all or a portion of which is implemented by one or more of the disclosed embodiments.

FIG. 3 shows an example user interface, all or a portion of which is implemented by one or more of the disclosed embodiments. User interface 300 of FIG. 3 displays a plurality of trip itinerary options 302 based on the arrival time selected, in some embodiments, via the control 202 or 204 of FIG. 2. The trip itinerary options 302 are selected for display based on a set of selectable criteria (not shown). For example, in some aspects, the selection of particular itineraries for display is configured to select itineraries matching the chosen arrival time (e.g. 202 or 204) most closely. Alternatively, the selection of itineraries for display is based on a weighting of multiple factors, such as one or more of proximity of an itinerary's arrival time to the selected arrival time, in addition to one or more of cost, total trip elapsed time, or other possible factors.

Figure 4:
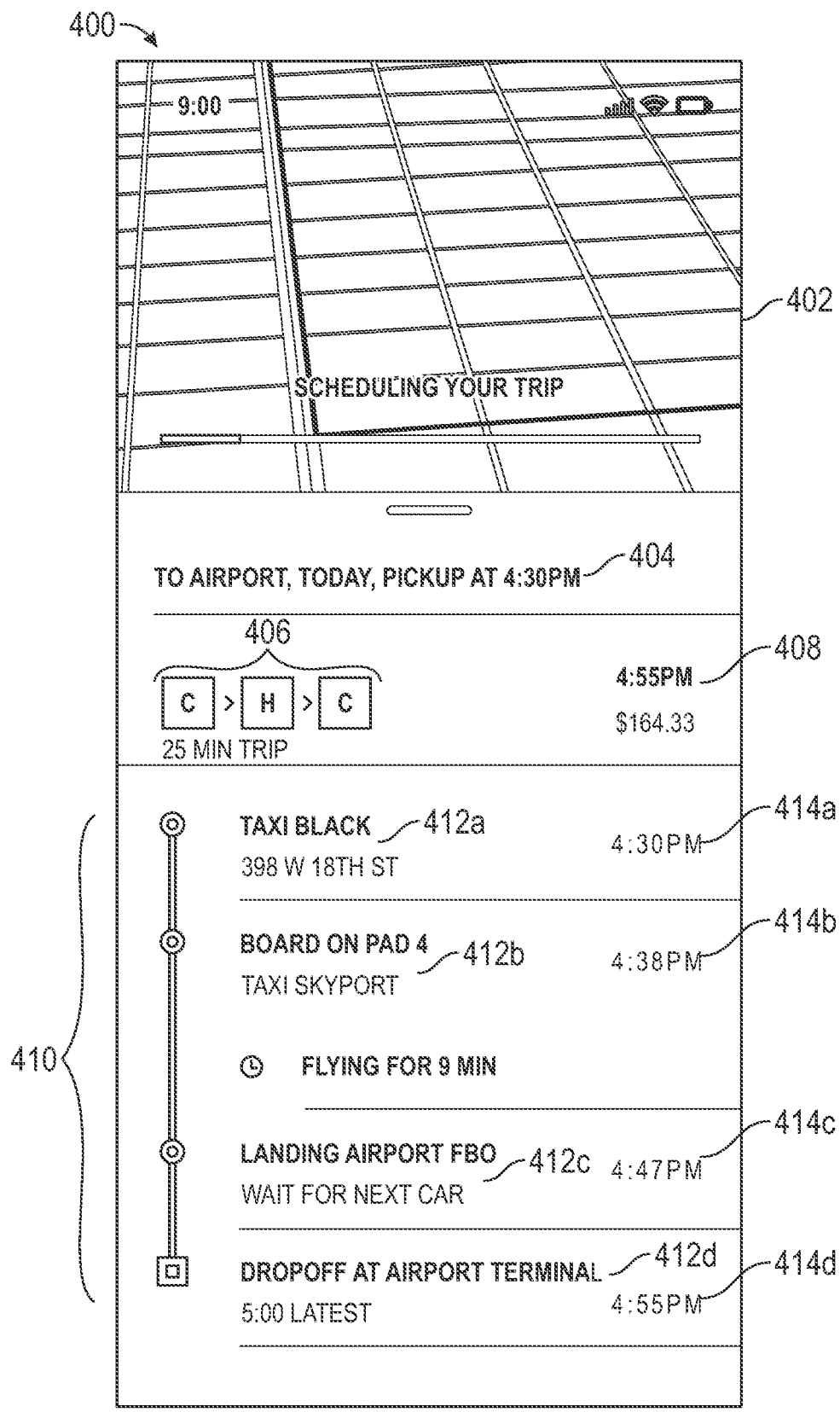
FIG. 4 shows an example of a user interface, all or a portion of which is implemented by one or more of the disclosed embodiments.

Once the one or more itinerary options 302 are displayed, input is received by selecting one of the itinerary options. In the example of FIG. 3, option 304*b* is selected. Selection of the control 306 requests the selected itinerary be booked. The user interface 300 also displays a trip modality indicator 310. The modality indicator 310 displays three different mode icons 312*a-c*, each representing a mode of travel for a particular leg of the current trip. Selecting any one of the mode icons 312*a-c* presents details on that particular leg of the trip on the user interface 300. For example, mode icons 312*a* and 312*c* will present details of a car service leg, while mode icon 312*b* presents details of a helicopter leg FIG. 4 shows an example user interface, all or a portion of which is implemented by one or more of the disclosed embodiments. The user interface 400 shown in FIG. 4 includes an application mode graphic 402, trip summary information 404, trip modality indicator 406, an arrival time estimate 408, and activity summary 410.

The activity summary 410 displays a plurality of activities 412*a-d* associated with the multi-modal transportation service and times associated with each activity 414*a-d*. For example, the activity summary 410 shows a ride activity 412*a*. The ride activity 412*a* starts at a time 414*a* of 4:30 PM. The activity summary 410 includes activities using different transportation modalities. For example, activity 412*a* uses a ground-based vehicle while activities 412*b* and 412*c* relate to use of an aerial vehicle.

Figure 5:
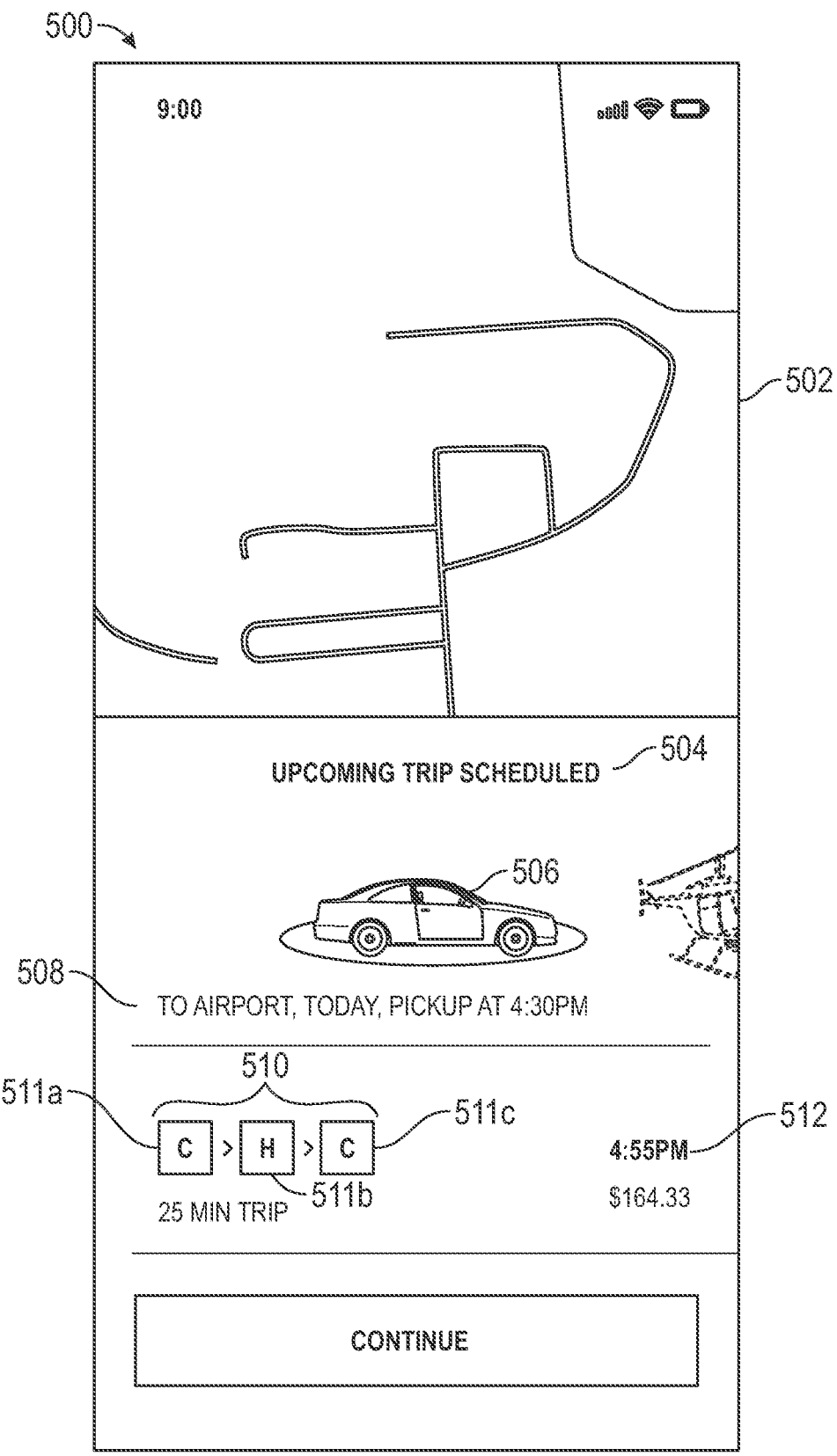
FIG. 5 shows an example of a user interface, all or a portion of which is implemented in one or more of the disclosed embodiments.

FIG. 5 shows an example user interface, all or a portion of which is implemented in one or more of the disclosed embodiments. The user interface 500 shown in FIG. 5 includes a map 502, summary information 504, an icon 506 indicating a first travel modality in the itinerary, destination summary information 508, a trip modality indicator 510, and an arrival time estimate 512. The summary information 504 shows a brief summary of a scheduled trip. As shown, the summary information includes information regarding a first leg of the trip, showing a pickup time for the first leg, and a destination location of the first leg. Summary information 504 also shows the icon 506 as a car, indicating the first leg of the trip will be accomplished via a car.

The trip modality indicator 510 includes, in some embodiments, an icon for each leg of a multi-modal itinerary, shown as icons 511*a-c*. Each icon is indicative of a modality of a particular leg of the multi-modal transportation service. The user interface 500 of FIG. 5 provides a summary of a scheduled trip. For example, the trip modality indicator 510 provides a quick summary of the multiple modes of travel included in the trip. A start time of the trip (via 512) is also provided.

Figure 6:
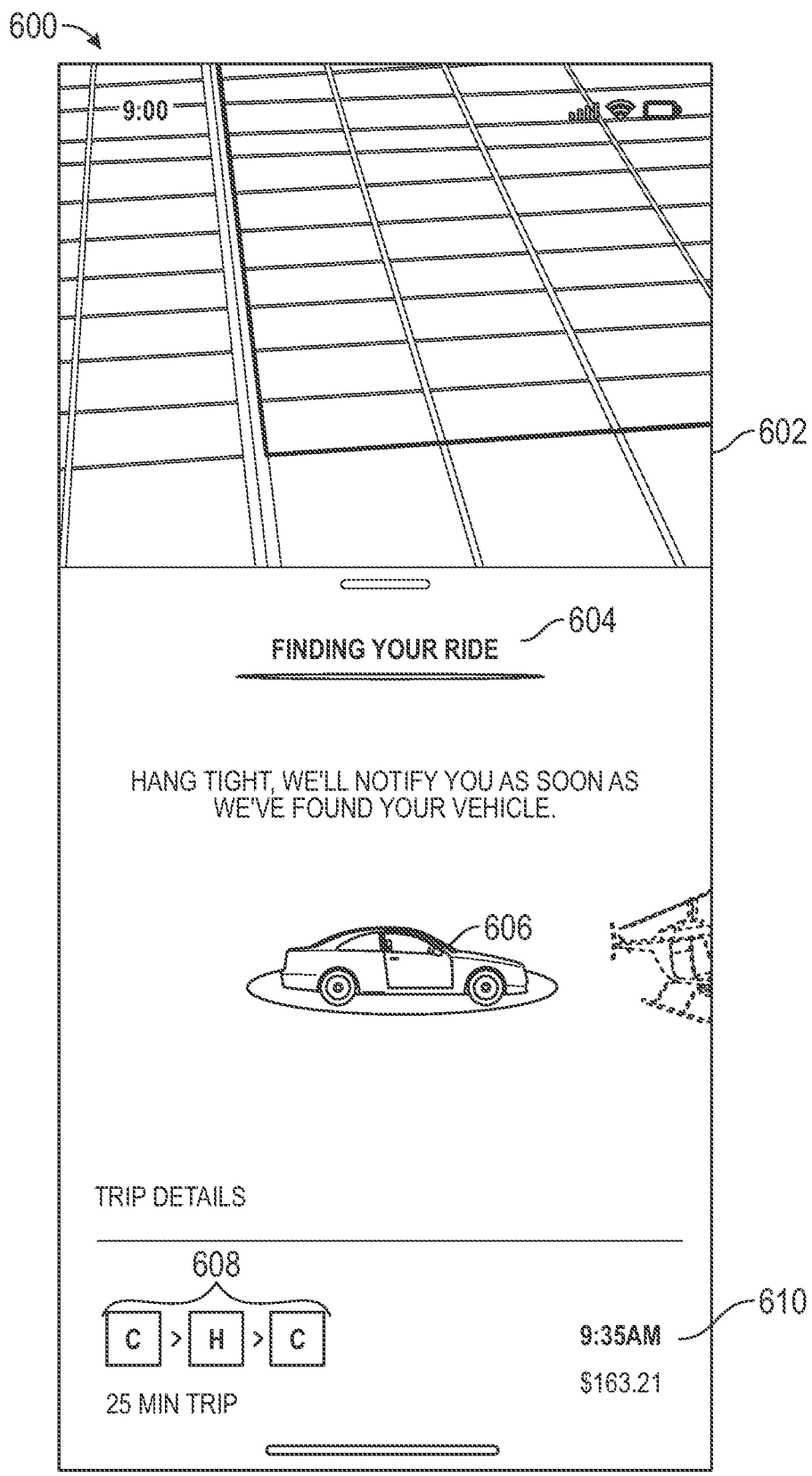
FIG. 6 shows an example of a user interface, all or a portion of which is implemented in one or more of the disclosed embodiments.

FIG. 6 shows an example user interface, all or a portion of which is implemented in one or more of the disclosed embodiments. The user interface 600 of FIG. 6 includes a graphic 602, a summary indicator 604, an icon 606, a trip modality indicator 608, and an arrival time estimate 610. The summary indicator 604 indicates a current status of a multi-modal travel management application hosting the user interface 600. As illustrated in FIG. 6, the current status indicates that a ride on a ground-based vehicle represented by the icon 606 is being identified for a traveler on the multi-modal transportation service.

Figure 7:
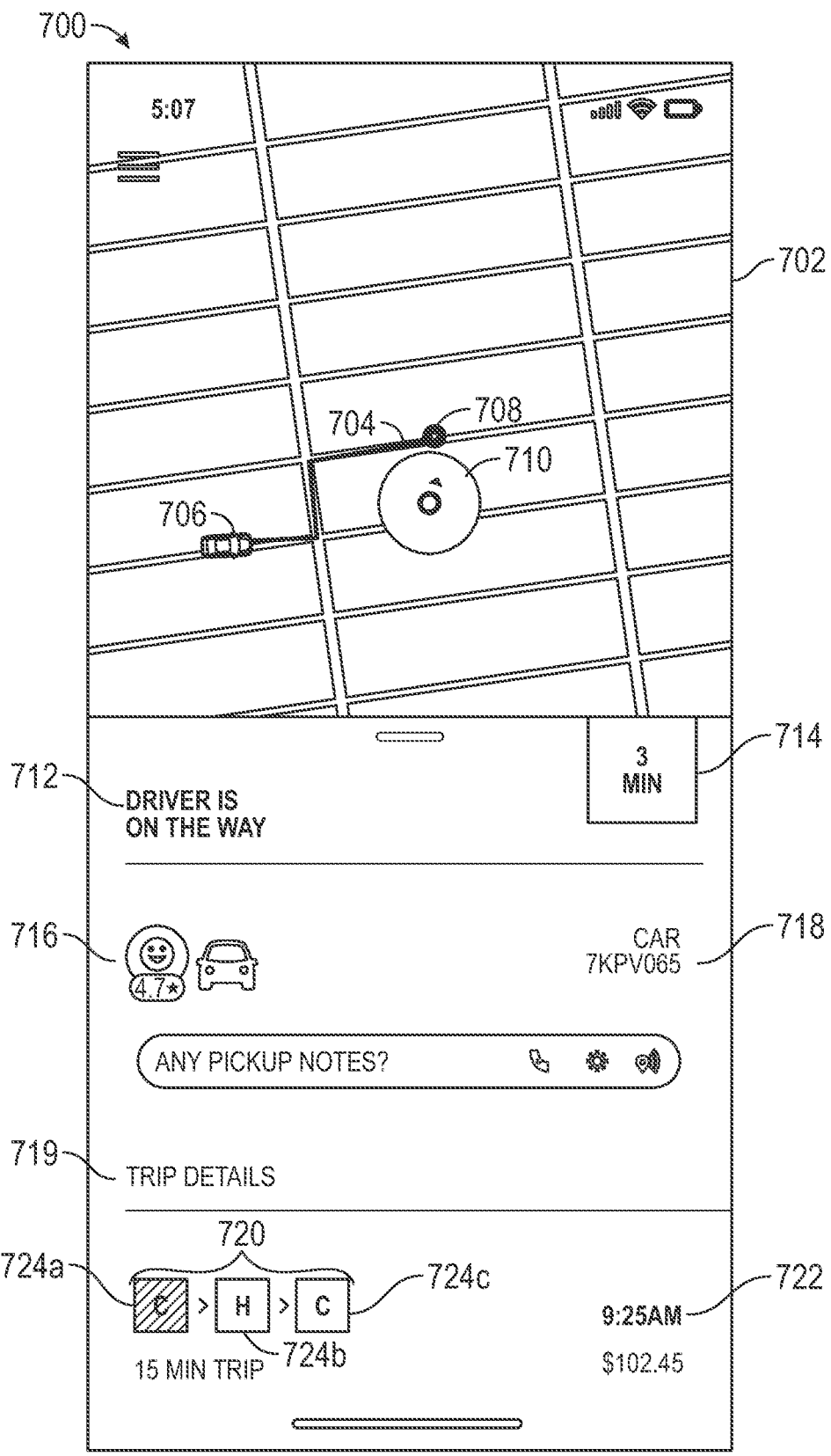
FIG. 7 shows an example of a user interface, all or a portion of which is implemented in one or more of the disclosed embodiments.

FIG. 7 shows an example user interface, all or a portion of which is implemented in one or more of the disclosed embodiments. The user interface 700 shown in FIG. 7 displays a map 702, a travel route 704, current vehicle location 706, pick up location 708, present location of traveler 710, status indicator 712, estimated time before pick up 714, vehicle operator information 716, and vehicle information 718.

The user interface 700 is also configured to display trip details 719. The trip details 719 include a trip modality indicator 720, and an estimated arrival time 722. The trip modality indicator displays a plurality of icons, each icon representing a leg of the multi-modal transportation service and also indicating a type of travel modality used to accomplish the represented leg. One icon included in the trip modality indicator, shown in the example user interface 700 as icon 724*a*, has a different appearance than the other icons 724*b-c*. This different appearance is achieved via one or more of a different color, different size, different font, different shading, different background, or other visual difference. This difference in one icon's appearance when compared to other icons in the trip modality indicator 720 indicates that the different icon represents a currently active modality of the trip.

The estimated time before pick up 714 indicates a time delay between a present time and a time when the traveler on the trip is expected to be picked up by the ground-based vehicle described in the vehicle operator information 716 and/or vehicle information 718.

Figure 8:
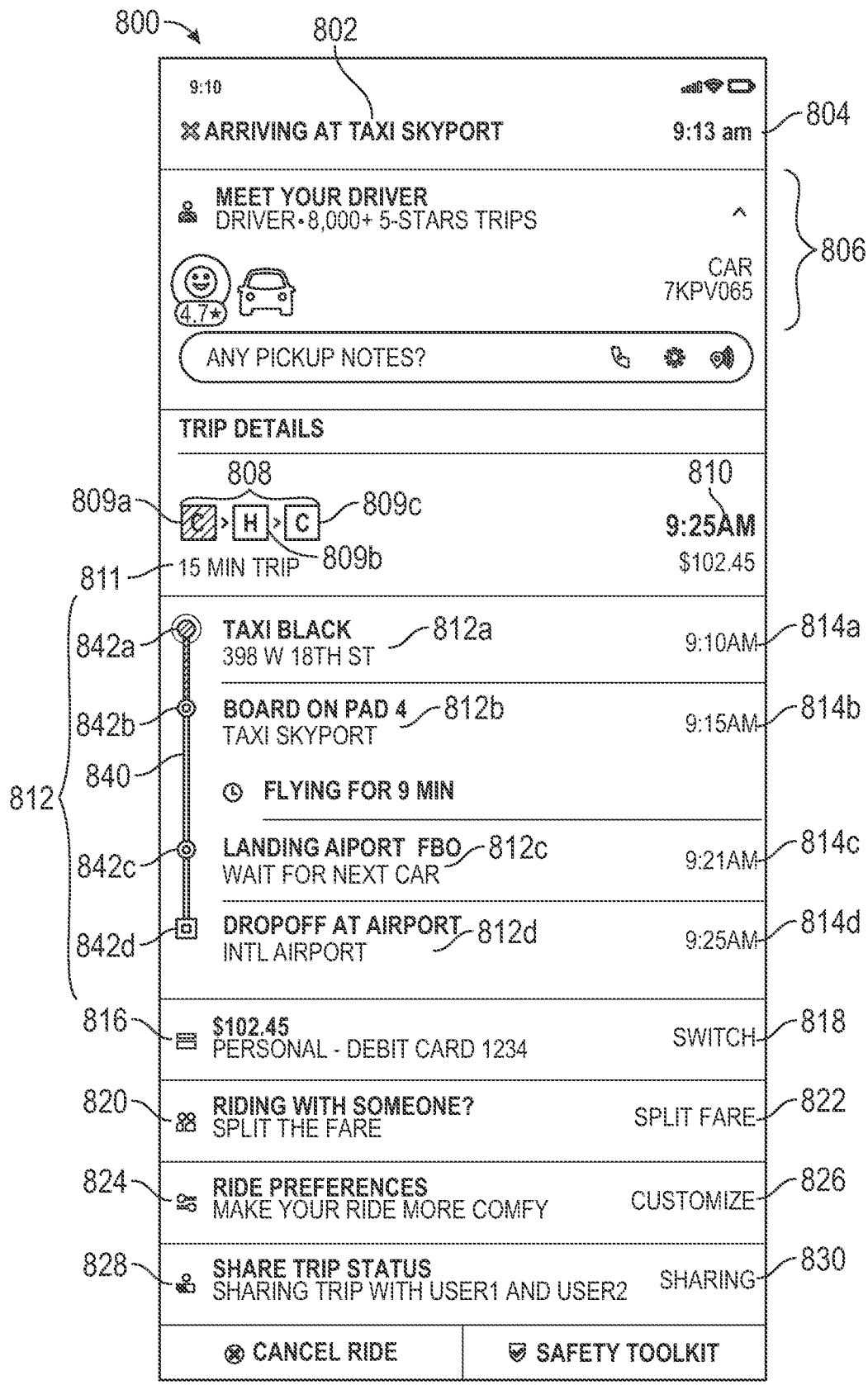
FIG. 8 shows an example of a user interface, all or a portion of which is implemented in one or more of the disclosed embodiments.

FIG. 8 shows an example user interface, all or a portion of which is implemented in one or more of the disclosed embodiments. The user interface 800 shown with respect to FIG. 8 is configured to display status information for an active trip. In some aspects, the user interface 800 is displayed in response to a location of a traveler on the trip meeting a criterion. For example, in some embodiments, if a traveler's location is within a predetermined threshold distance from an ending location for a leg of a multi-modal transportation service, the user interface 800 is displayed.

The example user interface 800 shows a current activity 802 of the multi-modal transportation service and an estimated time of completion of the current activity 804. Detailed information 806 for the current activity 804 is also shown. The detailed information 806 includes information about a vehicle operator for the current activity 804 and/or details on a vehicle in use for the current activity 804. For example, if the vehicle is a car, the detailed information 806 includes, in some embodiments, one or more of a make, model, color, and/or license plate number for the vehicle.

The user interface 800 also shows a trip modality indicator 808. The trip modality indicator 808 includes a separate icon 809*a-c* for each leg of a trip that uses a different modality. For example, as shown in FIG. 8, the trip modality indicator 808 includes a first icon 809*a* showing a first leg of the trip utilizes a ground-based vehicle, such as a car. The trip modality indicator 808 also includes a second icon 809*b* indicating a second leg of the trip utilizes an aerial vehicle, such as a helicopter. The trip modality indicator 808 also includes a third icon 809c indicating a third leg of the trip utilizes a ground-based vehicle, such as a car. The user interface 800 also displays an estimated arrival time 810 and an estimated elapsed time for the trip 811.

The user interface 800 also displays an activity summary 812 for the trip. The activity summary 812 includes a graphical trip status indicator 840. The graphical trip status indicator 840 graphically illustrates a timeline with times of interest called out as 842a-842d. These times of interest 842a-d correspond to a list of a plurality of activities 812a-d included in the trip. An estimated time of completion 814a-d for each of the plurality of activities 812a-d is also displayed.

The user interface 800 also displays payment information 816. The payment information 816 includes, for example, a source of funds to pay for the trip. A selectable control 818 is configured to modify the payment information 816. The user interface 800 also displays ride share information 820. The ride share information 820 indicates, in at least some embodiments, a list of travelers that are participating in the trip. The ride share information 820 also indicates, in some embodiments, which of the list of travelers are sharing responsibility for payment for the trip. A selectable control 822 is configured to modify the ride share information 820.

The user interface 800 also displays ride preference information 824. The ride preference information 824 includes, in some embodiments, travel options that are available for additional cost, such as valet service, beverage services, or meal services. A selectable control 826 is configured to provide for modification of the ride preference information 824. The user interface 800 is also configured to display trip sharing information 828. The trip sharing information 828 includes, for example, other users or contacts to which trip status information is automatically shared. A selectable control 830 provides for modification of the trip sharing information 828.

Figure 9:
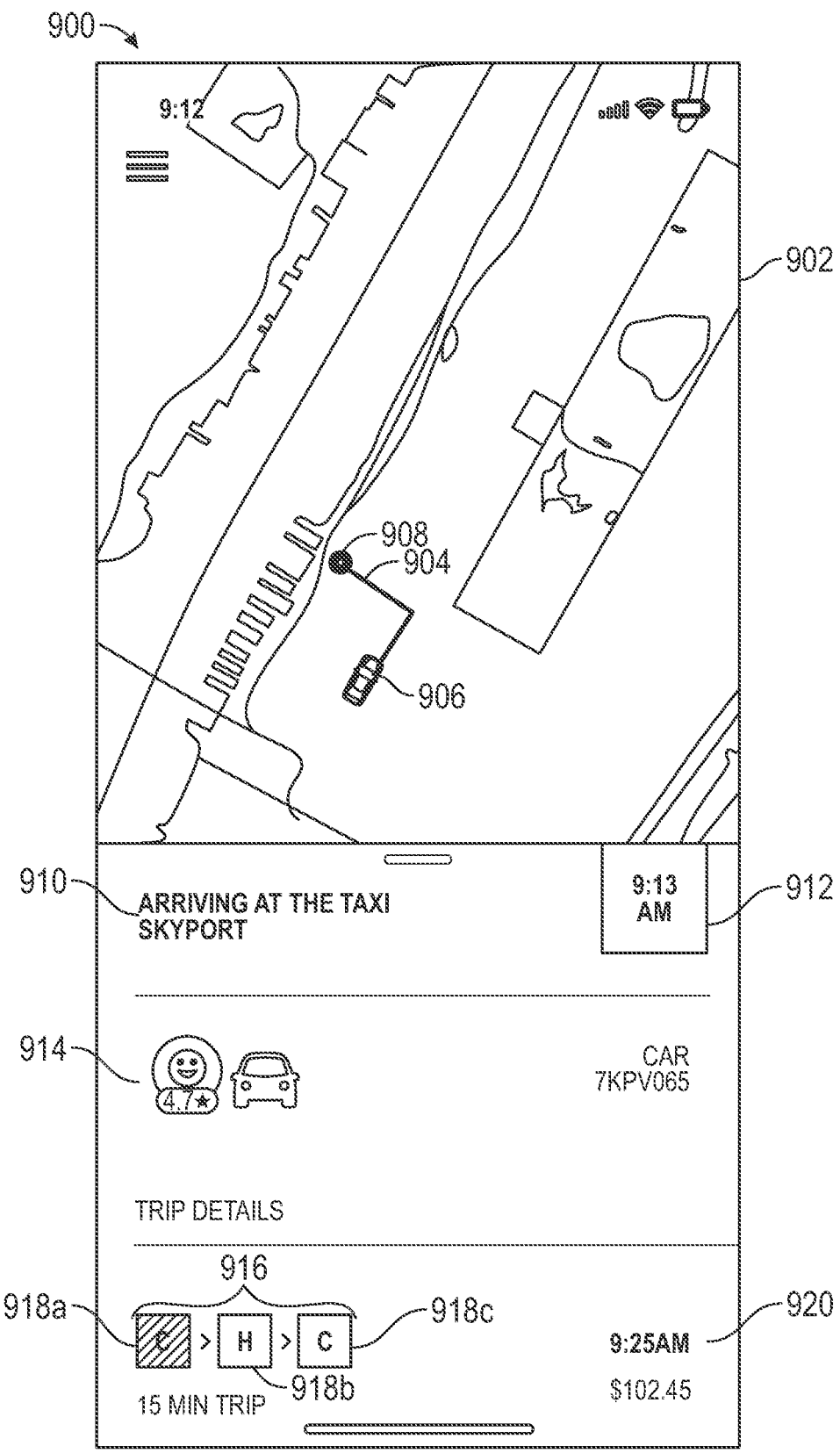
FIG. 9 shows an example of a user interface, all or a portion of which is implemented in one or more of the disclosed embodiments.

FIG. 9 shows an example user interface all or a portion of which is implemented in one or more of the disclosed embodiments. The user interface 900 includes a map 902. The map 902 shows a route of travel 904 for a current leg of the trip. The route of travel 904 shows a current vehicle position 906 and a destination 908 associated with the current leg. The user interface 900 also shows a status indicator 910. The status indicator 910 shows, in some embodiments, a current activity for the multi-modal transportation service and an estimated completion time 912 of the current activity. The user interface 900 also shows leg detail information 914. When a leg is utilizing a ground-based vehicle, the leg detail information 914 includes information about a vehicle operator and/or information about the vehicle itself, such as one or more of vehicle make, model, color, or license plate number. The user interface 900 also includes a trip modality indicator 916, including three icons 918a-c, each icon representing one leg of the multi-modal transportation service and further representing a travel mode or modality for the respective leg. The trip modality indicator 916 includes the first icon 918a to illustrate that a first leg of the multi-modal transportation service uses a ground-based vehicle such as a car, a second icon 918b illustrates that a second leg of the trip utilizes an aerial vehicle, such as a helicopter, and a third icon 918c illustrates that a third leg of the trip utilizes a ground-based vehicle. One icon of the trip modality indicator 916 is configured to display differently than the other icons of the trip modality indicator 916. The differently displayed icon represents a currently active leg of the trip. In the example of FIG. 9, the first icon 918a represents a current leg of the trip, as it is shown in a different color or shading than the other icons 918b and 918c. The user interface 900 also displays an estimated arrival time 920.

Figure 10:
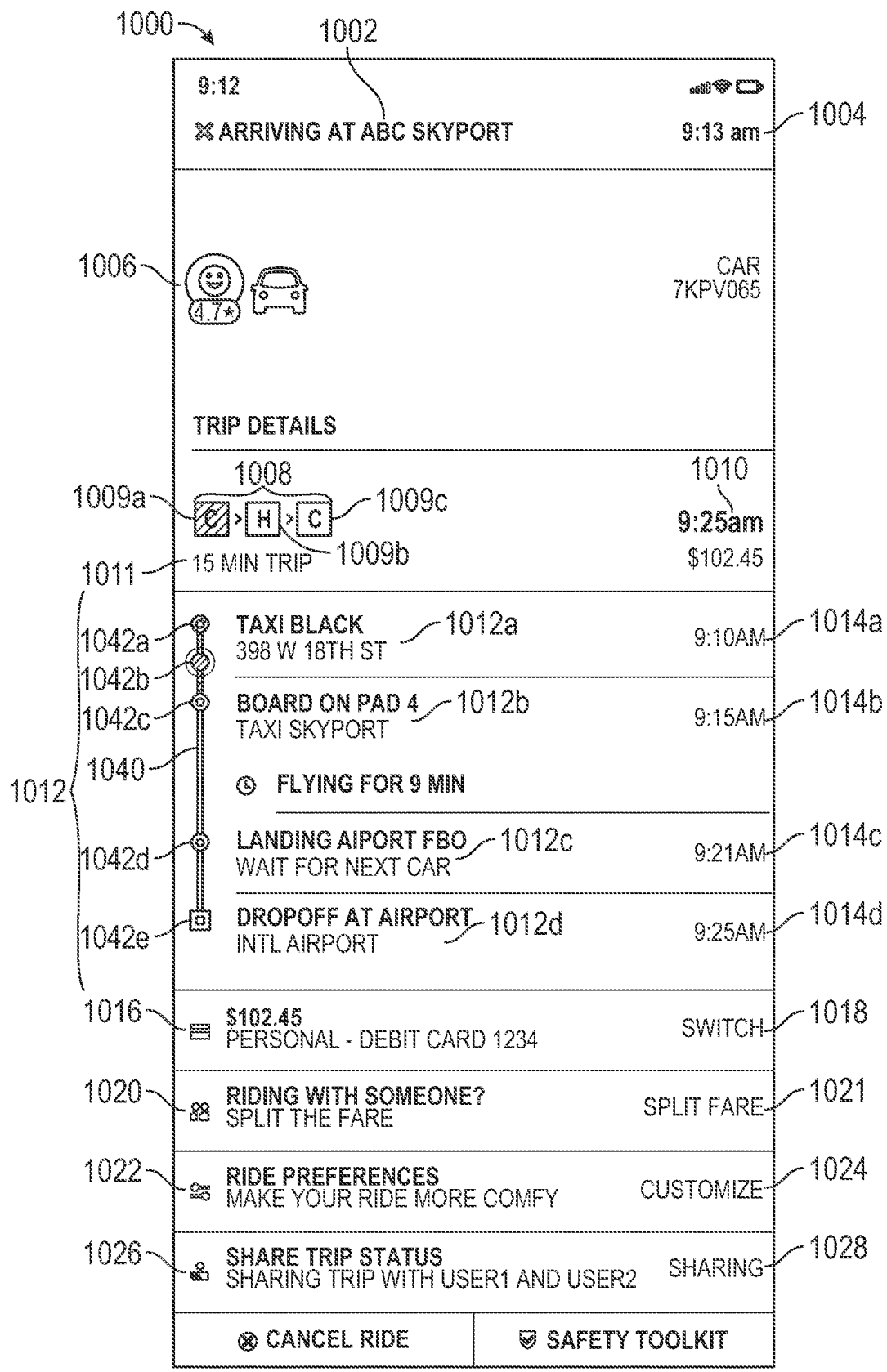
FIG. 10 shows an example of a user interface, all or a portion of which is implemented by one or more of the disclosed embodiments.

FIG. 10 shows an example of a user interface 1000, all or a portion of which is implemented by one or more of the disclosed embodiments. The user interface 1000 shown with respect to FIG. 10 is configured to display status information for an active trip. In particular, the user interface 1000 shows a current activity 1002 of the multi-modal transportation service and an estimated time of completion 1004 of the current activity 1002. Detailed information 1006 for the current activity is also shown. The detailed information 1006 includes information about a vehicle operator for the current activity and/or details on a vehicle completing the current activity. For example, if the vehicle is a car, the detailed information 1006 includes one or more of a make, model, color, and/or license plate number for the vehicle.

The user interface 1000 also shows a trip modality indicator 1008. The trip modality indicator 1008 includes separate icons 1009a-c for each leg of a trip that uses a different modality. For example, as shown in FIG. 10, the trip modality indicator 1008 includes a first icon 1009a showing a first leg of the trip utilizes a ground-based vehicle, such as a car. The trip modality indicator 1008 also includes a second icon 1009b indicating a second leg of the trip utilizes an aerial vehicle, such as a helicopter. The trip modality indicator 1008 also includes a third icon 1009c indicating a third leg of the trip utilizes a ground-based vehicle, such as a car. The user interface 1000 also displays an estimated arrival time 1010 and an estimated elapsed time 1011 for the multi-modal transportation service.

The user interface 1000 also displays an activity summary 1012 for the multi-modal transportation service. The activity summary 1012 includes a graphical trip status indicator 1040 that includes time points of interest 1042a-1042e. Each of the time points of interest 1042a-1042e corresponds to an activity included in a plurality of activities 1012a-d that are included in the multi-modal transportation service. A corresponding estimated time of completion 1014a-d for each of the plurality of activities 1012a-d is also displayed. Note that time point of interest 1042b is distinctively displayed relative to time points of interest 1042a, and 1042c-e. This visual distinctiveness of time point of interest 1042b indicates, in at least some embodiments, an alignment between the particular time point of interest and a current time.

The user interface 1000 also displays payment information 1016. The payment information 1016 includes, for example, a source of funds to pay for the trip. A selectable control 1018 is configured to modify the payment information 1016. The user interface 1000 also displays ride share information 1020. The ride share information 1020 indicates a list of travelers that are participating in the trip. The ride share information 1020 also indicates which of the list of travelers are sharing responsibility for payment for the trip. A selectable control 1021 is configured to modify the ride share information 1020.

The user interface 1000 also displays ride preference information 1022. The ride preference information 1022 includes travel options that are available for additional cost, such as valet service, beverage services, or meal services. A selectable control 1022 is configured to provide for modification of the ride preference information 1024. The user interface 1000 is also configured to display trip sharing information 1026. The trip sharing information 1026 includes, for example, other users or contacts to which trip status information is automatically shared. A selectable control 1028 provides for modification of the trip sharing information 1026.

FIG. 10 illustrates that at least some embodiments of status user interfaces display detail information with respect to a current leg of a trip. For example, FIG. 10 shows a current leg of the trip relates to a taxi ride activity 1012a. The information available below the activity summary 1012 is specific to the type of current activity, in at least some embodiments. For example, since the current activity is a taxi ride, information such as ride sharing (e.g. 1020), ride preferences (e.g. 1022) are displayed. Different information is displayed below the activity summary 1012, at least in some embodiments, for different modalities. For example, ride sharing information is not displayed in some embodiments if a current modality is an airplane or other aero vehicle.

Figure 11:
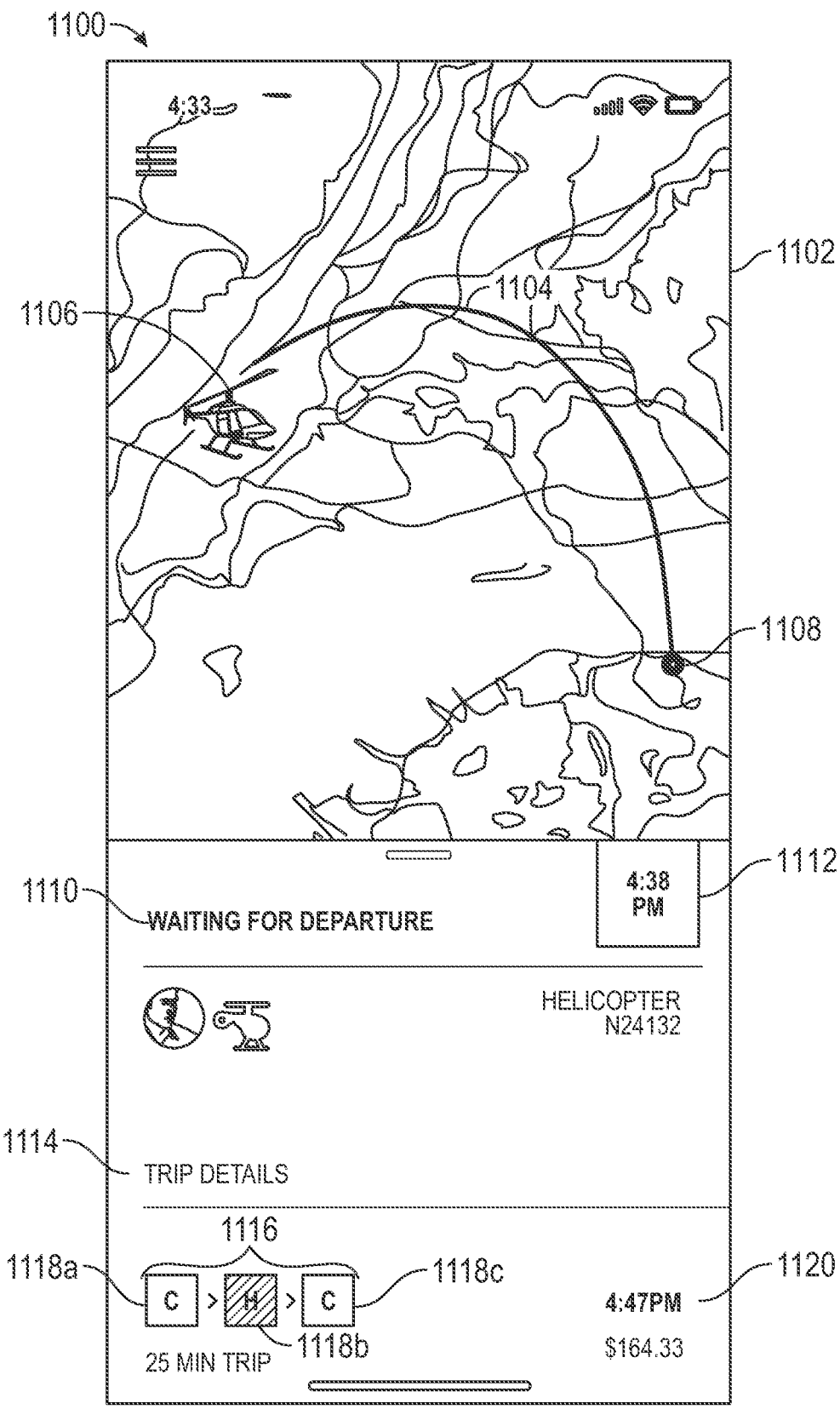
FIG. 11 shows a user interface, all or a portion of which is implemented by one or more of the disclosed embodiments.

FIG. 11 shows a user interface 1100, all or a portion of which is implemented by one or more of the disclosed embodiments. The user interface 1100 includes a map 1102. The map 1102 shows a route of travel 1104 for a current leg of the trip, which is the next leg after being dropped off at a skyport. The route of travel 1104 begins at a current vehicle position 1106 and ends at a destination 1108 of the current leg. The user interface 1100 also shows a status indicator 1110. The status indicator 1110 shows a current activity for the trip and an estimated completion time 1112 of the current activity.

The user interface 1100 also shows leg detail information 1114. In the example of FIG. 11, the current leg of the trip pertains to use of an aerial vehicle (e.g. helicopter). Thus, the leg detail information 1114 may include a photo of a pilot of the helicopter, an icon representing a helicopter, and identification information for the helicopter, such as an "N" number.

The user interface 1100 also includes a trip modality indicator 1116, including three icons 1118a-c, each icon representing one leg of the trip and further representing a travel mode or modality for the leg. Similar to examples in previously described user interfaces, the trip modality indicator 1116 includes the first icon 1118a to represent a first leg of the trip utilizes a ground vehicle (e.g., car), a second icon 1118b to represent a second leg of the trip utilizes a helicopter, and a third icon 1118c to represent a third leg of the trip utilizes a ground vehicle. An icon of the trip modality indicator 1116 includes one icon that is displayed differently than the other icons. The differently displayed icon represents a currently active leg of the trip. In the example of FIG. 11, the second icon 1118b represents a current leg of the trip. The user interface 1100 also displays an estimated arrival time 1120 of the current leg.

Figure 12:
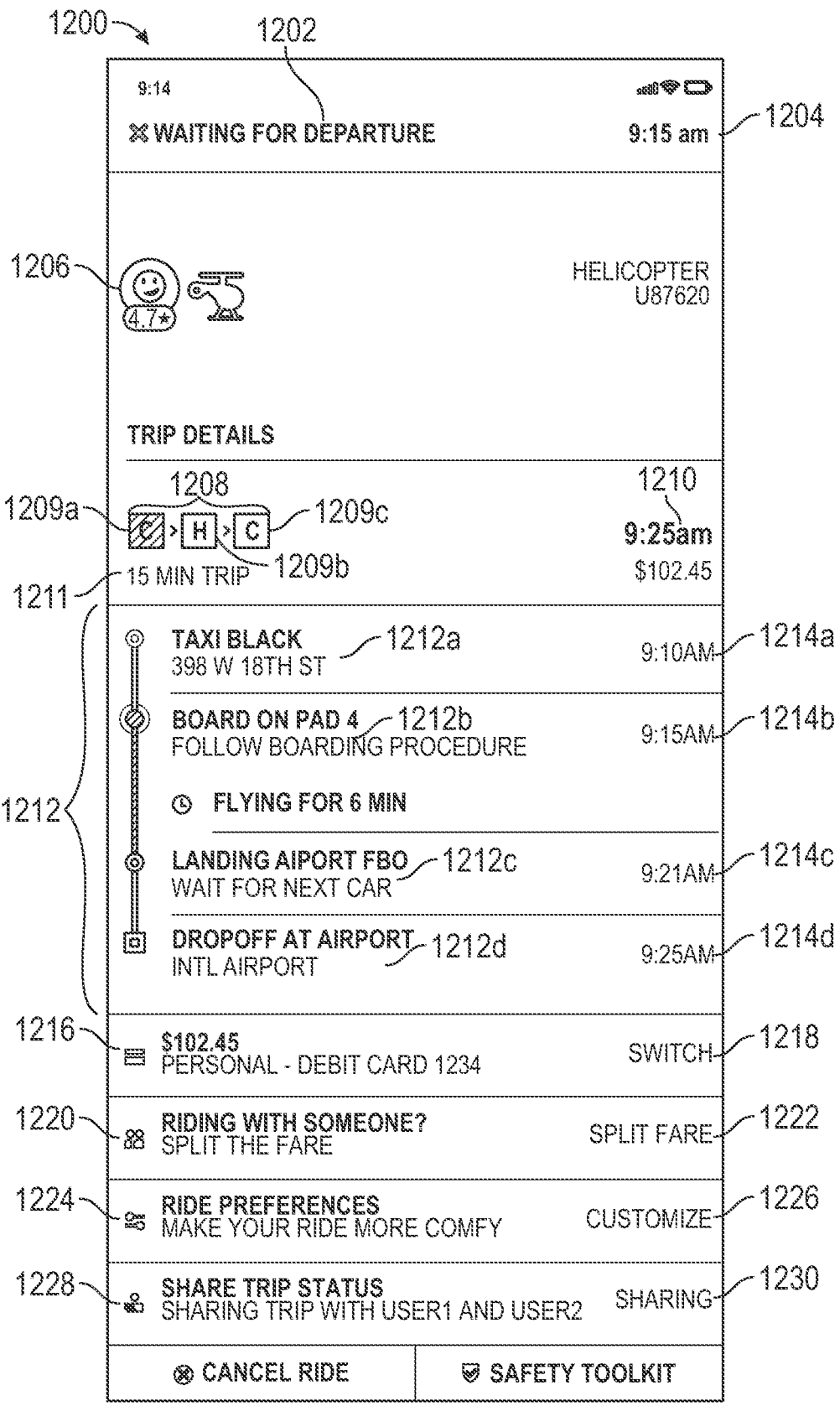
FIG. 12 shows an example of a user interface, all or a portion of which is implemented by one or more of the disclosed embodiments

FIG. 12 shows an example of a user interface 1200, all or a portion of which is implemented by one or more of the disclosed embodiments. The user interface 1200 shown with respect to FIG. 12 is configured to display status information for an in-progress multi-modal transportation service. In particular, the user interface 1200 shows a current leg of the trip 1202 and an estimated time of completion of the current leg 1204, which in this example is the second leg of the trip. Detailed information 1206 for the current leg is also shown. The detailed information 1206 includes information about a pilot when the current leg 1204 makes use of an aerial vehicle, such as a helicopter. The detailed information 1206 also includes an icon representing the aerial vehicle, and/or additional information about the aerial vehicle, such as a type of aerial vehicle and/or identification of the specific aerial vehicle, such as an "N" number of the aerial vehicle.

The user interface 1200 also shows a trip modality indicator 1208. The trip modality indicator 1208 includes a separate icon 1209a-c for each leg of a trip that uses a different modality. For example, as shown in FIG. 12, the trip modality indicator 1208 includes a first icon 1209a showing a first leg of the trip utilizes a ground-based vehicle, such as a car. The trip modality indicator 1208 also includes a second icon 1209b indicating a second leg of the trip utilizes an aerial vehicle, such as a helicopter, other vehicle implementing vertical take-out and lift technology, etc. The trip modality indicator 1208 also include a third icon 1209c indicating a third leg of the trip utilizes a ground-based vehicle, such as a car. The user interface 1200 also displays an estimated arrival time 1210 and an estimated elapsed time for the trip 1211.

The user interface 1200 also displays an activity summary 1212 for the trip. The activity summary 1212 lists a plurality of activities 1212a-d included in the trip. An estimated time of completion 1214a-d for each of the plurality of activities 1212a-d is also displayed.

The user interface 1200 also displays payment information 1216. The payment information 1216 includes, for example, a source of funds to pay for the trip. A selectable control 1218 is configured to modify the payment information 1216. The user interface 1200 also displays ride share information 1220. The ride share information 1220 indicates a list of travelers that are participating in the trip. The ride share information 1220 also indicates which of the list of travelers are sharing responsibility for payment for the trip. A selectable control 1222 is configured to modify the ride share information 1220.

The user interface 1200 also displays ride preference information 1224. The ride preference information 1224 includes travel options that are available for additional cost, such as valet service, beverage services, or meal services. A selectable control 1226 is configured to provide for modification of the ride preference information 1224. The user interface 1200 is also configured to display trip sharing information 1228. The trip sharing information 1228 includes, for example, other users or contacts to which trip status information is automatically shared. A selectable control 1230 provides for modification of the trip sharing information 1228.

Figure 13:
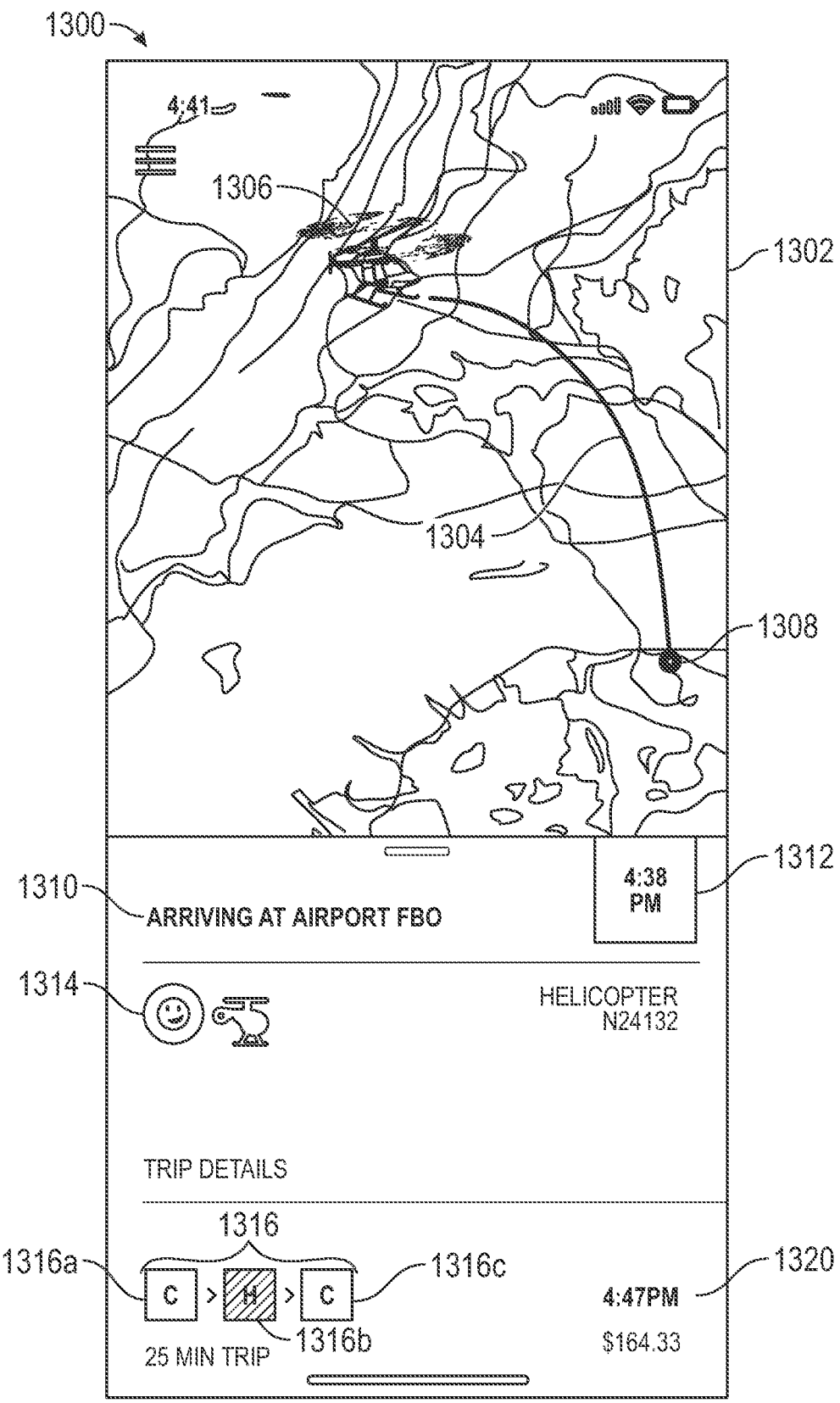
FIG. 13 shows a user interface, all or a portion of which is implemented by one or more of the disclosed embodiments.

FIG. 13 shows a user interface 1300, all or a portion of which is implemented by one or more of the disclosed embodiments. The user interface 1300 includes a map 1302. The map 1302 shows a route of travel 1304 for a current leg of the trip (e.g., the second leg). The route of travel 1304 begins at a current vehicle position 1306 and ends at a destination 1308 of the current leg. The user interface 1300 also shows a status indicator 1310. The status indicator 1310 shows a current activity for the trip and an estimated completion time 1312 of the current activity.

The user interface 1300 also shows leg detail information 1314. In the example of FIG. 13, the current leg of the trip pertains to use of a helicopter. Thus, the leg detail information 1314 includes one or more of a photo of a pilot of the helicopter, an icon representing a helicopter, or identification information for the helicopter, such as an "N" number.

The user interface 1300 also includes a trip modality indicator 1316, including three icons 1316a-c, each icon representing one leg of the trip and further representing a travel mode or modality for the leg. Similar to examples in previously described user interfaces, the trip modality indicator 1316 includes the first icon 1316a to represent a first leg of the trip utilizes a vehicle, a second icon 1316b to represent a second leg of the trip utilizes an aerial vehicle, and a third icon 1316*c* to represent a third leg of the trip utilizes a vehicle. An icon of the trip modality indicator 1316 includes one icon that is displayed differently than the other icons. The differently displayed icon represents a currently in-progress leg of the trip. In the example of FIG. 13, the icon 1318*b* represents a current leg of the trip (e.g., the second leg). The user interface 1300 also displays an estimated arrival time 1320 for the current leg.

Figure 14:
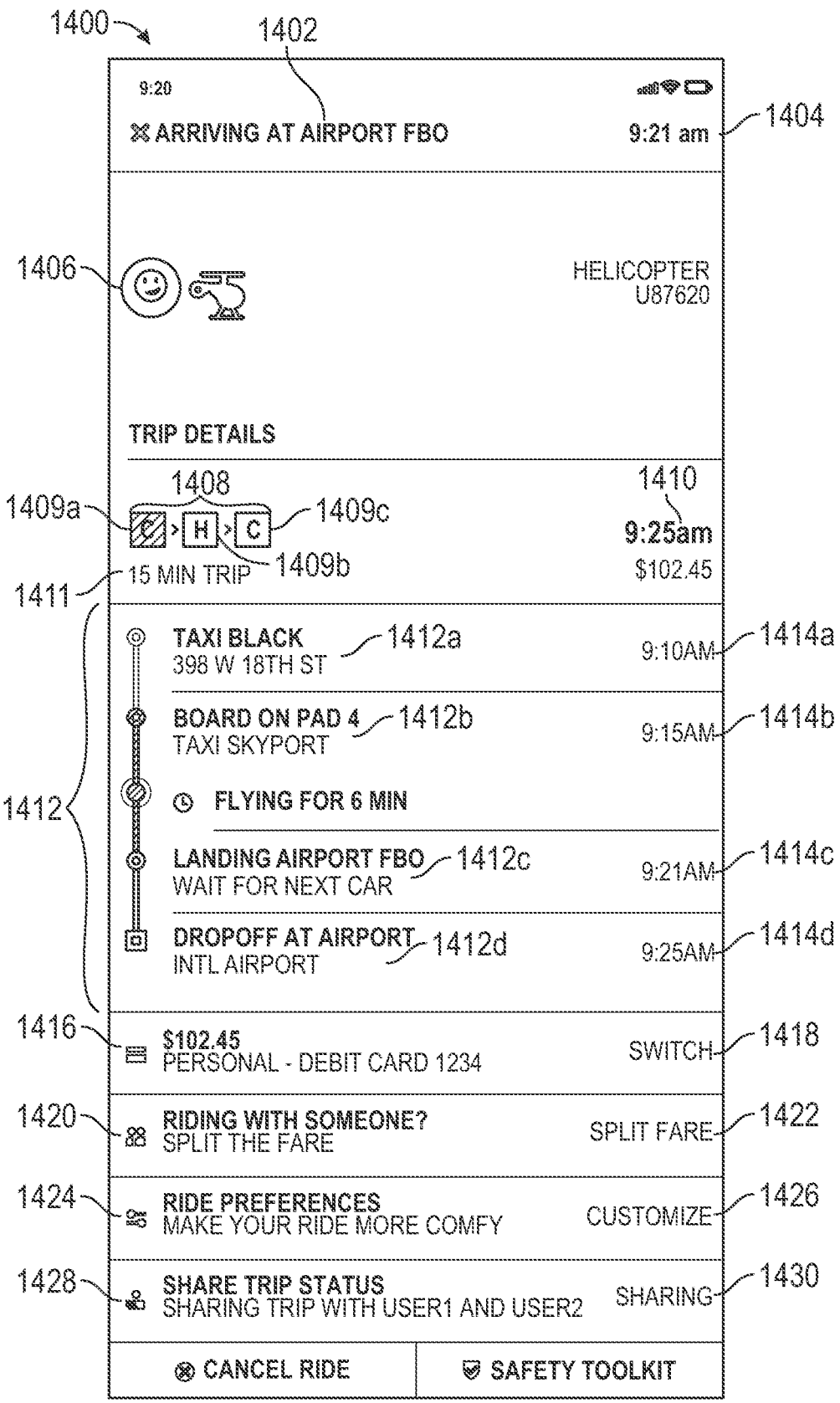
FIG. 14 shows an example of a user interface, all or a portion of which is implemented by one or more of the disclosed embodiments

FIG. 14 shows an example of a user interface 1400, all or a portion of which is implemented by one or more of the disclosed embodiments. The user interface 1400 shown with respect to FIG. 14 is configured to display status information for an in progress multi-modal transportation service. In particular, the user interface 1400 shows a current leg of the trip 1402 and an estimated time of completion of the current leg 1404. Detailed information 1406 for the current leg is also shown. The detailed information 1406 includes information about a pilot when the current leg 1404 makes use of an aerial vehicle, such as a helicopter. The detailed information 1406 also includes, in at least some embodiments, an icon representing the aerial vehicle, and/or additional information about the aerial vehicle, such as a type of aerial vehicle and/or identification of the specific aerial vehicle, such as an "N" number of the aerial vehicle.

The user interface 1400 also shows a trip modality indicator 1408. The trip modality indicator 1408 includes a separate icon 1409*a-c* for each leg of a trip that uses a different modality. For example, as shown in FIG. 14, the trip modality indicator 1408 includes a first icon 1409*a* showing a first leg of the trip utilizes a ground-based vehicle, such as a car. The trip modality indicator 1408 also includes a second icon 1409*b* indicating a second leg of the trip utilizes an aerial vehicle, such as a helicopter. The trip modality indicator 1408 also includes a third icon 1409*c* indicating a third leg of the trip utilizes a ground-based vehicle, such as a car. One of the icons 1409*a-c* of the trip modality indicator 1408 is displayed differently than the other icons, for example, via different color, brightness, shading, or other visual indicator. The different icon represents a current modality of the trip. In FIG. 14, the different icon is 1409*a*, as shown.

The user interface 1400 also displays an estimated arrival time 1410 and an estimated elapsed time for the trip 1411.

The user interface 1400 also displays an activity summary 1412 for the trip. The activity summary 1412 lists a plurality of activities 1412*a-d* included in the trip. An estimated time of completion 1414*a-d* for each of the plurality of activities 1412*a-d* is also displayed.

The user interface 1400 also displays payment information 1416. The payment information 1416 includes, for example in some embodiments, a source of funds to pay for the trip. A selectable control 1418 is configured to modify the payment information 1416. The user interface 1400 also displays ride share information 1420. The ride share information 1420 indicates a list of travelers that are participating in the trip. The ride share information 1420 also indicates which of the list of travelers are sharing responsibility for payment for the trip. A selectable control 1422 is configured to modify the ride share information 1420.

The user interface 1400 also displays ride preference information 1424. The ride preference information 1424 includes travel options that are available for additional cost, such as valet service, beverage services, or meal services. A selectable control 1426 is configured to provide for modification of the ride preference information 1424. The user interface 1400 is also configured to display trip sharing information 1428. The trip sharing information 1428 includes, for example, other users or contacts to which trip status information is automatically shared. A selectable control 1430 provides for modification of the trip sharing information 1428.

Figure 15:
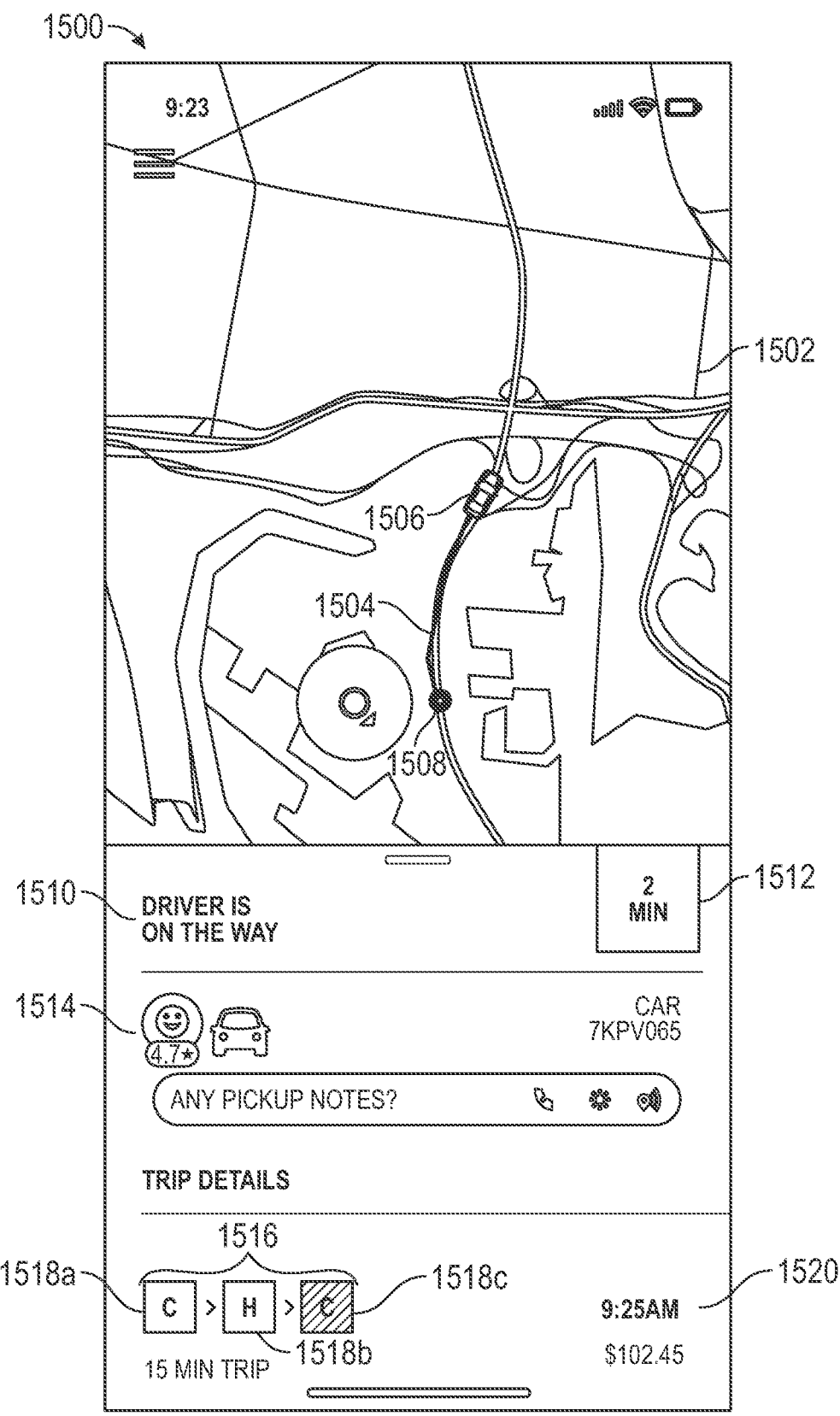
FIG. 15 shows a user interface, all or a portion of which is implemented by one or more of the disclosed embodiments.

FIG. 15 shows a user interface 1500, all or a portion of which is implemented by one or more of the disclosed embodiments. The user interface 1500 includes a map 1502. The map 1502 shows a route of travel 1504 for a current leg of the trip (e.g., the third leg). The route of travel 1504 begins at a current vehicle position 1506 and ends at a destination 1508 of the current leg. The user interface 1500 also shows a status indicator 1510. The status indicator 1510 shows a current activity for the trip and an estimated completion time 1512 of the current activity.

The user interface 1500 also shows leg detail information 1514. When the leg utilizes a ground-based vehicle, the leg detail information 1514 includes information regarding a vehicle operator and/or information about the vehicle itself, such as one or more of vehicle make, model, color, or license plate number. In the example of FIG. 15, the current leg of the trip pertains to use of a ground-based vehicle. Thus, the leg detail information 1514 includes one or more of a photo of a vehicle operator, an icon representing a ground-based vehicle, or identification information for the vehicle, such as a license plate number.

The user interface 1500 also includes a trip modality indicator 1516, including three icons 1518*a-c*, each icon representing one leg of the trip and further representing a travel mode or modality for the leg. Similar to examples in previously described user interfaces, the trip modality indicator 1516 includes the first icon 1518*a* to represent a first leg of the trip utilizes a vehicle, a second icon 1518*b* to represent a second leg of the trip utilizes a helicopter, and a third icon 1518*c* to represent a third leg of the trip utilizes a vehicle. An icon of the trip modality indicator 1516 includes one icon that is displayed differently than the other icons. The differently displayed icon represents a currently in-progress leg of the trip. In the example of FIG. 15, the third icon 1518*c* represents a current leg of the trip. The user interface 1500 also displays an estimated arrival time 1520.

Figure 16:
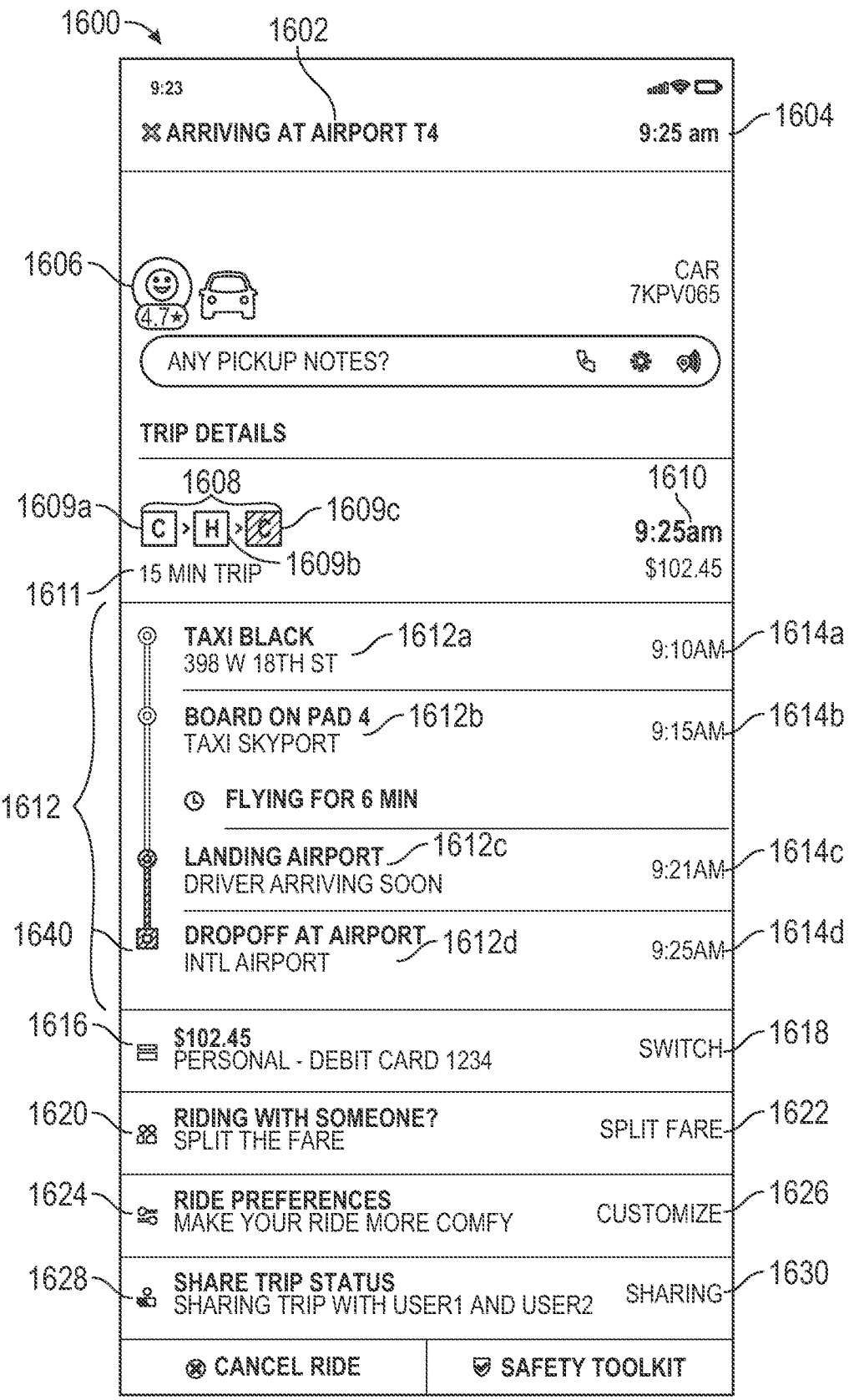
FIG. 16 shows an example of a user interface, all or a portion of which is implemented by one or more of the disclosed embodiments.

FIG. 16 shows an example of a user interface 1600, all or a portion of which is implemented by one or more of the disclosed embodiments. The user interface 1600 shown with respect to FIG. 16 is configured to display status information for an in-progress multi-modal transportation service. In particular, the user interface 1600 shows a current activity of the trip 1602 and an estimated time of completion of the current activity 1604. Detailed information 1606 for the current leg is also shown. The detailed information 1606 includes information about a vehicle operator when the current activity 1604 makes use of a ground-based vehicle, such as a sport utility vehicle (SUV). The detailed information 1606 also includes, in at least some embodiments, one or more of an icon representing the ground-based vehicle, and/or additional information about the ground-based vehicle, such as a type of ground-based vehicle and/or identification of the specific ground-based vehicle, such as a license plate number.

The user interface 1600 also shows a trip modality indicator 1608. The trip modality indicator 1608 includes a separate icon 1609*a-c* for each leg of a trip that uses a different modality. For example, as shown in FIG. 16, the trip modality indicator 1608 includes a first icon 1609*a* showing a first leg of the trip utilizes a ground-based vehicle, such as a car. The trip modality indicator 1608 also includes a second icon 1609*b* indicating a second leg of the trip utilizes an aerial vehicle, such as a helicopter. The trip modality indicator 1608 also include a third icon 1609c indicating a third leg of the trip utilizes a ground-based vehicle, such as a car. One of the icons 1609a-c of the trip modality indicator 1608 is displayed differently than the other icons, for example, via different color, brightness, shading, or other visual indicator. The different icon represents a current modality of the trip.

The user interface 1600 also displays an estimated arrival time 1610 and an estimated elapsed time for the trip 1611.

The user interface 1600 also displays an activity summary 1612 for the trip. The activity summary 1612 lists a plurality of activities 1612a-d included in the trip. An estimated time of completion 1614a-d for each of the plurality of activities 1612a-d is also displayed. Note that an icon 1640 associated with a current activity is displayed different than other, non current activities.

The user interface 1600 also displays payment information 1616. The payment information 1616 includes, for example, a source of funds to pay for the trip. A selectable control 1618 is configured to modify the payment information 1616. The user interface 1600 also displays ride share information 1620. The ride share information 1620 indicates a list of travelers that are participating in the trip. The ride share information 1620 also indicates which of the list of travelers are sharing responsibility for payment for the trip. A selectable control 1622 is configured to modify the ride share information 1620.

The user interface 1600 also displays ride preference information 1624. The ride preference information 1624 includes, in at least some embodiments, travel options that are available for additional cost, such as valet service, beverage services, or meal services. A selectable control 1626 is configured to provide for modification of the ride preference information 1624. The user interface 1600 is also configured to display trip sharing information 1628. The trip sharing information 1628 includes, for example, other users or contacts to which trip status information is automatically shared. A selectable control 1630 provides for modification of the trip sharing information 1628.

Figure 17:
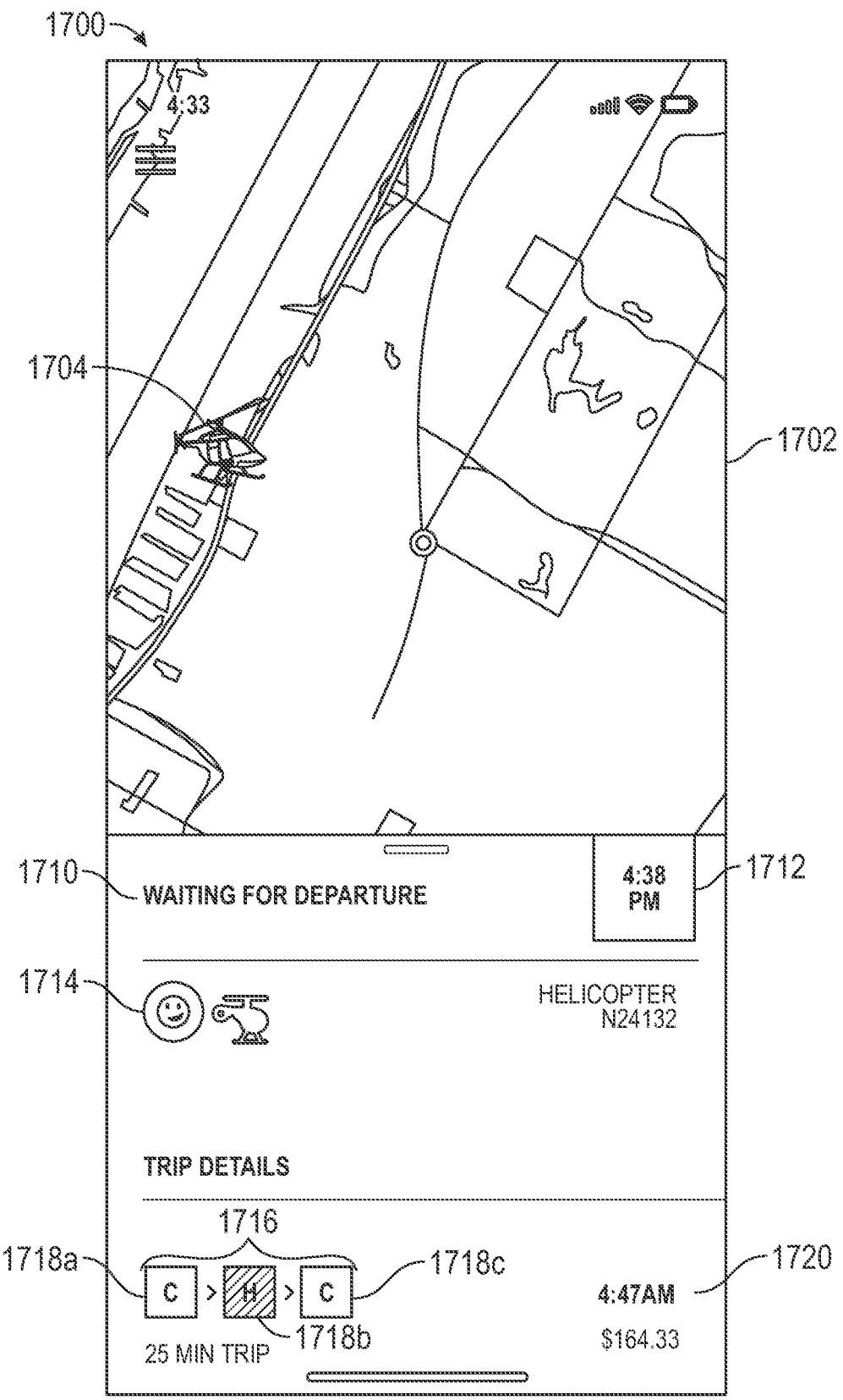
FIG. 17 shows a user interface, all or a portion of which is implemented by one or more of the disclosed embodiments.

FIG. 17 shows a user interface 1700, all or a portion of which is implemented by one or more of the disclosed embodiments. The user interface 1700 includes a map 1702. The map 1702 shows a present location 1704 of a traveler. The user interface 1700 also shows a status indicator 1710. The status indicator 1710 shows a current activity for the trip and an estimated completion time 1712 of the current activity.

The user interface 1700 also shows leg detail information 1714. When the leg utilizes a ground-based vehicle, the leg detail information 1714 includes information about a vehicle operator and/or information about the vehicle itself, such as one or more of vehicle make, model, color, or license plate number. In the example of FIG. 17, the current leg of the trip pertains to use of an aerial vehicle. Thus, the leg detail information 1714 includes a photo of an operator (e.g. pilot) of the aerial vehicle, an icon representing an aerial vehicle, and identification information for the aerial vehicle, such as an "N" number.

The user interface 1700 also includes a trip modality indicator 1716, including three icons 1718a-c, each icon representing one leg of the trip and further representing a travel mode or modality for the leg. Similar to examples in previously described user interfaces, the trip modality indicator 1716 includes the first icon 1718a to represent a first leg of the trip utilizes a vehicle, a second icon 1718b to represent a second leg of the trip utilizes a helicopter, and a third icon 1718c to represent a third leg of the trip utilizes a vehicle. An icon of the trip modality indicator 1716 includes one icon that is displayed differently than the other icons. The differently displayed icon represents a currently in-progress leg of the trip. In the example of FIG. 17, the icon 1718b represents a current leg of the trip. The user interface 1700 also displays an estimated arrival time 1720.

Figure 18:
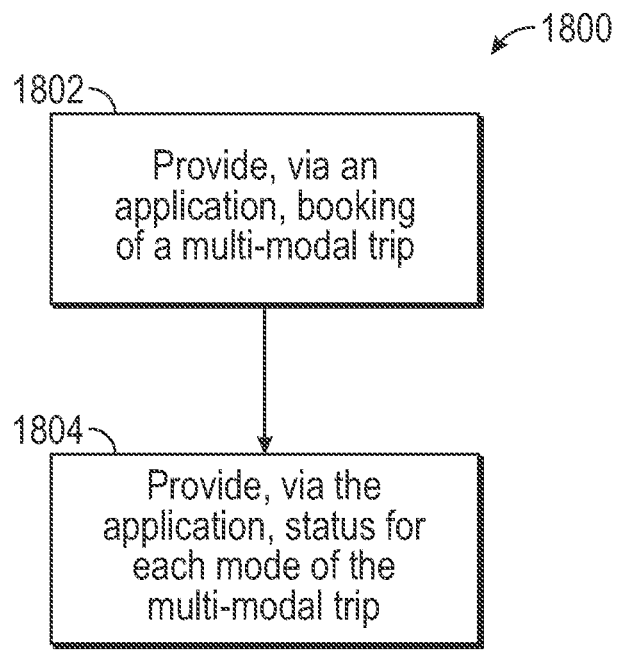
FIG. 18 is a flowchart of an example method that is implemented in one or more of the disclosed embodiments.

FIG. 18 is a flowchart of an example process that is implemented in one or more of the disclosed embodiments. For example, in some aspects, instructions stored in an electronic memory configures hardware processing circuitry to perform one or more of the functions discussed below with respect to FIG. 18. In some embodiments, one or more of the functions discussed below with respect to FIG. 18 and process 1800 are performed by a mobile device application. FIG. 18 describes operation of an application that provides for both booking of a multi-modal trip and status information for the trip when the trip is in process. For example, after booking a trip, when a current time approaches a start time for the trip, the application shifts from a booking mode to a status mode, where the user interface is focused on providing information on an active trip and collecting any information necessary from the traveler to ensure successful completion of the trip as it progresses through each of the multiple modalities.

In operation 1802, booking of a multi-modal transportation service is provided by an application. The multi-modal transportation service includes at least two travel legs, with at least two of the legs utilizing different modes of transportation to move one or more travelers from a source location of the leg to a destination location of the leg. Each of the different modes of transportation includes, in one or more embodiments, one of an aerial vehicle, such as a helicopter or airplane, and a ground-based vehicle, such as a car, bus, train, or scooter. One leg includes walking in some embodiments. In some aspects, the different legs represent different ground-based vehicles for two different legs. For example, a multi-modal transportation service could include two legs, with a first leg having a traveler walk from a source location of the first leg to a destination location of the first leg, and a vehicle to accomplish a second leg, such as a ground-based vehicle or an aerial vehicle, to move from a source location of the second leg to a destination location of the second leg.

Booking of the trip includes, in some embodiments, receiving input defining an arrival time at a destination location of the trip. For example, as illustrated in FIG. 2, a user interface is provided that is configured to receive input defining the arrival time (e.g. via control 202 and/or 204). Booking of the trip also includes, in some embodiments, requesting a search for trip itineraries based on the received arrival time. In some aspects, the search for trip itineraries identifies itineraries that provide arrival at the destination location at a time closest to the received arrival time. In some aspects, the requested search for trip itineraries considers multiple variables when identifying itineraries to be presented on a user interface. For example, arrival time, cost, total elapsed time, modes of transportation used, number of legs of the trip, or other factors are considered in various aspects. The identified itineraries are presented on a user interface, for example, as shown in FIG. 3 with trip itinerary options 302. In some aspects, a computing device requests a search for itineraries from a back-end, cloud, or server based implementation, that is in communication with the computing device via a communications network, such as the Internet. In some aspects, the computing device provides one or more parameters that control particular attributes of how the search is performed. For example, the computing device indicates, in some embodiments, whether the search should identify itineraries based on arrival time, cost, elapsed time, or a combination of these factors. In some cases, the computing device defines a weight assigned to one or more factors that are applied by the back-end, cloud, or server search implementation when performing the search.

Booking a trip also includes displaying a trip modality indicator, such as that shown in FIG. 3 as trip modality indicator 310. The trip modality indicator 310 indicates each of any different modes of transportation used in a particular itinerary.

Some embodiments transition a mobile device application performing process 1800 from a booking mode to a status mode when a current time falls within a predetermined time window of a start time of a trip. When in the booking mode, the mobile device application makes available user interfaces to facilitate searching and booking new trips. Modification or editing of existing trips is also provided in the booking mode. In the status mode, user interfaces of the mobile device application are focused on provides status for a "current" or "upcoming" trip. The status information includes, for example, information relating to scheduled start and stop times for each leg of the trip. Display of status information is in response to the transition of the mobile device application from the booking mode to the status mode. Upon completion of the trip, the mobile device application transitions back to the booking mode.

In operation 1804, travel status information for each in progress mode of the trip booked in operation 1802 is provided. The travel status information is provided via the same application used in operation 1802 to book the trip, although in some other embodiments, different applications are used for booking and status. The displaying of status in operation 1804 is performed, in at least some embodiments, when a current time is within a threshold distance from a start time for the multi-modal transportation service (multi-modal trip). Upon detecting that the time for the trip to begin is approaching the application transitions from a booking mode to a status mode. When the trip is completed otherwise terminates, the application transitions from the status mode back to the booking mode.

Providing status for the multi-modal transportation service includes, in some embodiments, displaying any portion of one or more of the user interfaces 100-1700 discussed above with respect to FIGS. 1-17. Generally, providing status is performed whenever a current time is within a threshold time of a start time of the multi-modal transportation service and/or while the multi-modal transportation service is in progress. For example, providing status includes displaying, via a display device of a user device, a current activity associated with the multi-modal transportation service, such as illustrated by the display of activities 412*a*-*d* of FIG. 4. The status includes, in some embodiments, an estimated start time and/or a completion time for the activities, such as times 414*a*-*d* shown in FIG. 4. Summary information for an upcoming trip is displayed, for example, as illustrated by summary information 404 of FIG. 4 in some embodiments.

Some embodiments display a "moving window" of status information for the trip based on a current time. For example, some embodiments display not only status information for a portion of the trip currently in progress, but also display status information for a second portion of the trip that is yet to begin. For example, when a first leg of a multi-modal transportation service is in progress, a user is traveling on a train. The application displays status information for the train portion of the trip, since the first leg is in progress. Before arriving at an airport for their flight, the application also provides, at least in some embodiments not only status information for the in-progress train travel of the first leg, also makes available status information relating to a second leg, which is their upcoming flight. Status information for the second leg can include information such as whether the flight is on-time, gate information, terminal information, or other information relating to the upcoming flight. After the first leg is complete, the "moving window" of status information displayed includes, in some embodiments, information relating to a third leg of the trip that will be performed after the second leg is complete. Status information for the first leg of the trip is no longer displayed after the first leg is complete, at least in some embodiments. In other embodiments, status information for a completed leg of a trip remains available until a predetermined period of time elapses after completion or other termination of the multi-modal transportation service.

In some aspects, a map is displayed to illustrate trip status information (e.g. 702 or 902 or 1102). The map designates a current location of a traveler of the trip (e.g. 710 or 906 or 1106), a pick up location for the traveler (e.g. 708), a remaining portion of a route of travel for a particular leg of the trip for which status is being provided (e.g. 904, or 1104), a destination location for a leg of the trip (e.g. 908 or 1108).

In some aspect, displaying status includes displaying information relating to a vehicle operator for a particular leg of the multi-modal transportation service (e.g. 716, 914, 1114, 1206). For example, the vehicle operator information includes, in some embodiments, one or more of a photograph of the vehicle operator, a title for the vehicle operator (e.g. "pilot"), a feedback rating for the vehicle operator or information relating to a vehicle used for the leg of the trip, such as a vehicle type (e.g. "Car" or "Helicopter"), and a vehicle registration number (e.g. license plate number or aircraft "N" number).

In some aspects, providing status includes displaying a trip modality indicator (e.g. 608, 808, 720, 808). The trip modality indicator includes a separate indicator for each portion of the trip using a different travel modality. For example, the trip modality indicator shows a first indicator indicating a ground-based vehicle is used for a first leg or portion of the trip, a second indicator indicating an aerial vehicle is used for a second leg or portion of the trip, and a third indicator indicating a ground-based vehicle is used for a third portion of the multi-modal transportation service.

Providing status for a multi-modal transportation service also includes displaying a graphical trip status indicator (e.g. 840 or 1040). In some embodiments the graphical trip status indicator is vertically oriented when viewing the user interface. The graphical trip status indicator includes, in some embodiments, separate indicators for a plurality of activities of the multi-modal transportation service. One indicator is visually distinct from the other separate indicators. This visually distinct indicator represents a current activity of the multi-modal transportation service. The separate indicators include activity indicators for each activity or leg associated with a multi-modal transportation service (e.g. 842*a*-*d* or 1042*a*-*e*). An activity indicator representing a current activity appears differently than the other indicators to indicate it represents the current activity (e.g. 842*a* or 1042*b*). In some embodiments, the activity indicators are icons. In some aspects, operation 1804 includes process 1900 discussed below with respect to FIG. 19.

Some embodiments of process 1800 include requesting a search of multi-modal itineraries that provide trip arrival times closest to a request arrival time at a final destination. For example, a search user interface of some embodiments is configured to accept input defining the trip arrival time desired by a user. The search then determines which multi-modal itineraries satisfy the requested arrival time. The search results in a list of multi-modal itineraries that meet criterion specified by the search. In some embodiments, the list is provided in a response to the search. This list includes zero or more multi-modal itineraries. These identified multi-modal itineraries are then displayed, via the application, on a user interface for user review. In some embodiments, the display includes one or more of arrival times, cost, elapsed times, or number of legs of each of the multi-modal itineraries satisfying the requested arrival time (or satisfying the requested arrival time within a predetermined threshold time difference).

Figure 19:
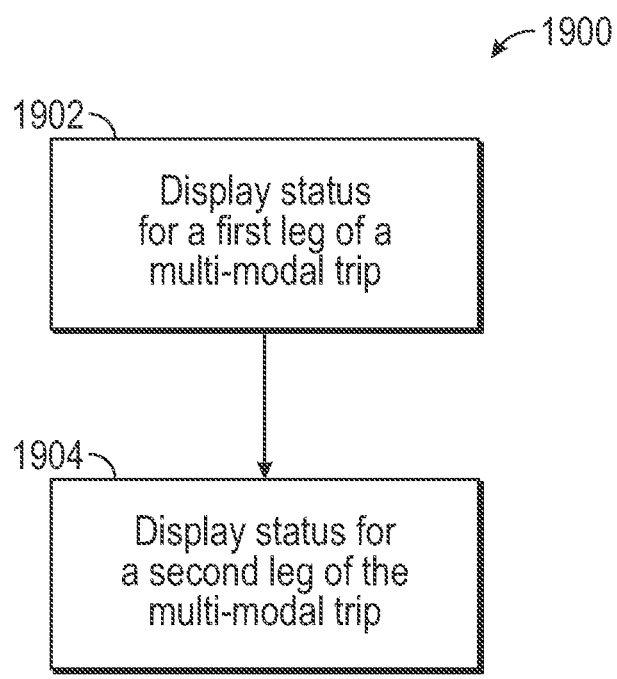
FIG. 19 is a flowchart of an example method that is implemented in one or more of the disclosed embodiments.

FIG. 19 is a flowchart of a method that is implemented in one or more of the disclosed embodiments. For example, in some aspects, instructions stored in an electronic memory (e.g. 2104 and/or 2106) configures hardware processing circuitry (e.g. 2102) to perform one or more of the functions discussed below with respect to FIG. 19.

In operation 1902, status for a first leg of a multi-modal transportation service is displayed. In some aspects, operation 1902 includes display of any portion of one or more of the user interfaces shown in FIGS. 8-17.

In operation 1904, status for a second leg of the multi-modal transportation service is displayed. The travel modality of the second leg is different than a travel modality of the first leg. In some aspects, operation 1904 includes display of any portion of one or more of the user interfaces shown in FIGS. 8-17.

Figure 20:
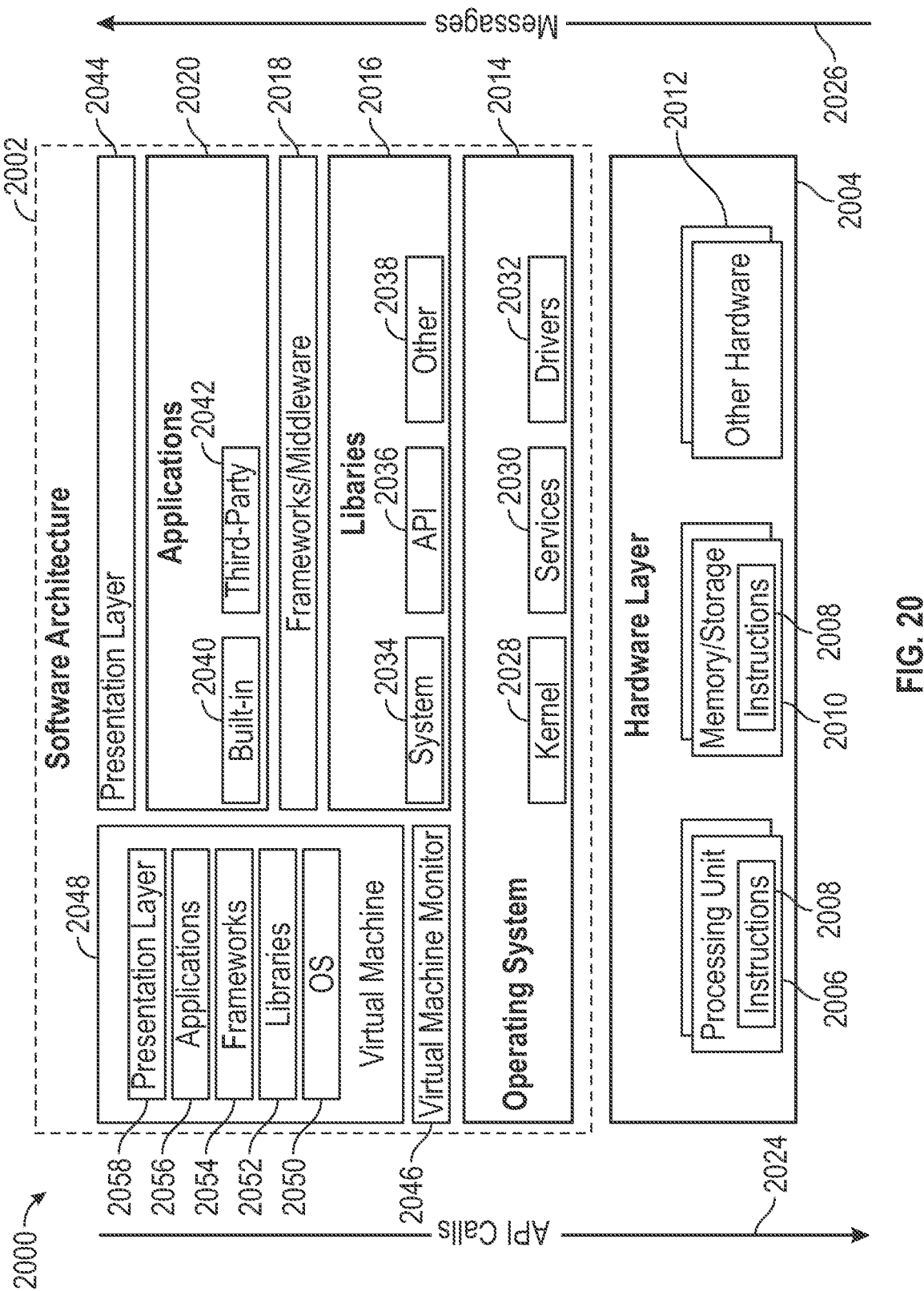
FIG. 20 is a block diagram showing one example of a software architecture for a computing device.

FIG. 20 is a block diagram 2000 showing one example of a software architecture 2002 for a computing device. In some embodiments, one or more portions of the software architecture 2002 is used in conjunction with various hardware architectures, for example, as described herein. FIG. 20 is merely a non-limiting example of a software architecture 2002 and many other architectures are implemented to facilitate the functionality described herein. A representative hardware layer 2004 is illustrated and can represent, for example, any of the above-referenced computing devices. In some examples, the hardware layer 2004 is implemented according to a hardware architecture 2100 of FIG. 21 and/or the software architecture 2002 of FIG. 20.

The representative hardware layer 2004 comprises one or more processing units 2006 having associated executable instructions 2008. The executable instructions 2008 represent the executable instructions of the software architecture 2002, including implementation of the methods, modules, components, and so forth of FIGS. 1-19. The hardware layer 2004 also includes memory and/or storage modules 2010, which also have the executable instructions 2008. The hardware layer 2004 also comprises, in some embodiments, other hardware 2012, which represents any other hardware of the hardware layer 2004, such as the other hardware illustrated as part of the architecture 700.

In the example architecture of FIG. 20, the software architecture 2002 may be conceptualized as a stack of layers where each layer provides particular functionality. For example, the software architecture 2002 includes layers such as an operating system 2014, libraries 2016, frameworks/middleware 2018, applications 2020, and a presentation layer 2044. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special-purpose operating systems may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. In some examples, the services 2030 include an interrupt service. The interrupt service may detect the receipt of a hardware or software interrupt and, in response, cause the software architecture 2002 to pause its current processing and execute an ISR when an interrupt is received. The ISR may generate an alert.

The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), WiFi® drivers, NFC drivers, audio drivers, power management drivers, and so forth depending on the hardware configuration.

The libraries 2016 may provide a common infrastructure that may be used by the applications 2020 and/or other components and/or layers. The libraries 2016 typically provide functionality that allows other software modules to perform tasks in an easier fashion than by interfacing directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be used by the applications 2020 and/or other software components/modules. For example, the frameworks 2018 may provide various graphical user interface (GUI) functions, high-level resource management, high-level location services, and so forth. The frameworks 2018 may provide a broad spectrum of other APIs that may be used by the applications 2020 and/or other software components/modules, some of which may be specific to a particular operating system or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. The third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 2042 may invoke the API calls 2024 provided by the mobile operating system such as the operating system 2014 to facilitate functionality described herein.

The applications 2020 may use built-in operating system functions (e.g., kernel 2028, services 2030, and/or drivers 2032), libraries (e.g., system libraries 2034, API libraries 2036, and other libraries 2038), or frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 20, this is illustrated by a virtual machine 2048. A virtual machine creates a software environment where applications/modules can execute as if they were executing on a hardware computing device. The virtual machine 2048 is hosted by a host operating system (e.g., the operating system 2014) and typically, although not always, has a virtual machine monitor 2046, which manages the operation of the virtual machine 2048 as well as the interface with the host operating system (e.g., the operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Figure 21:
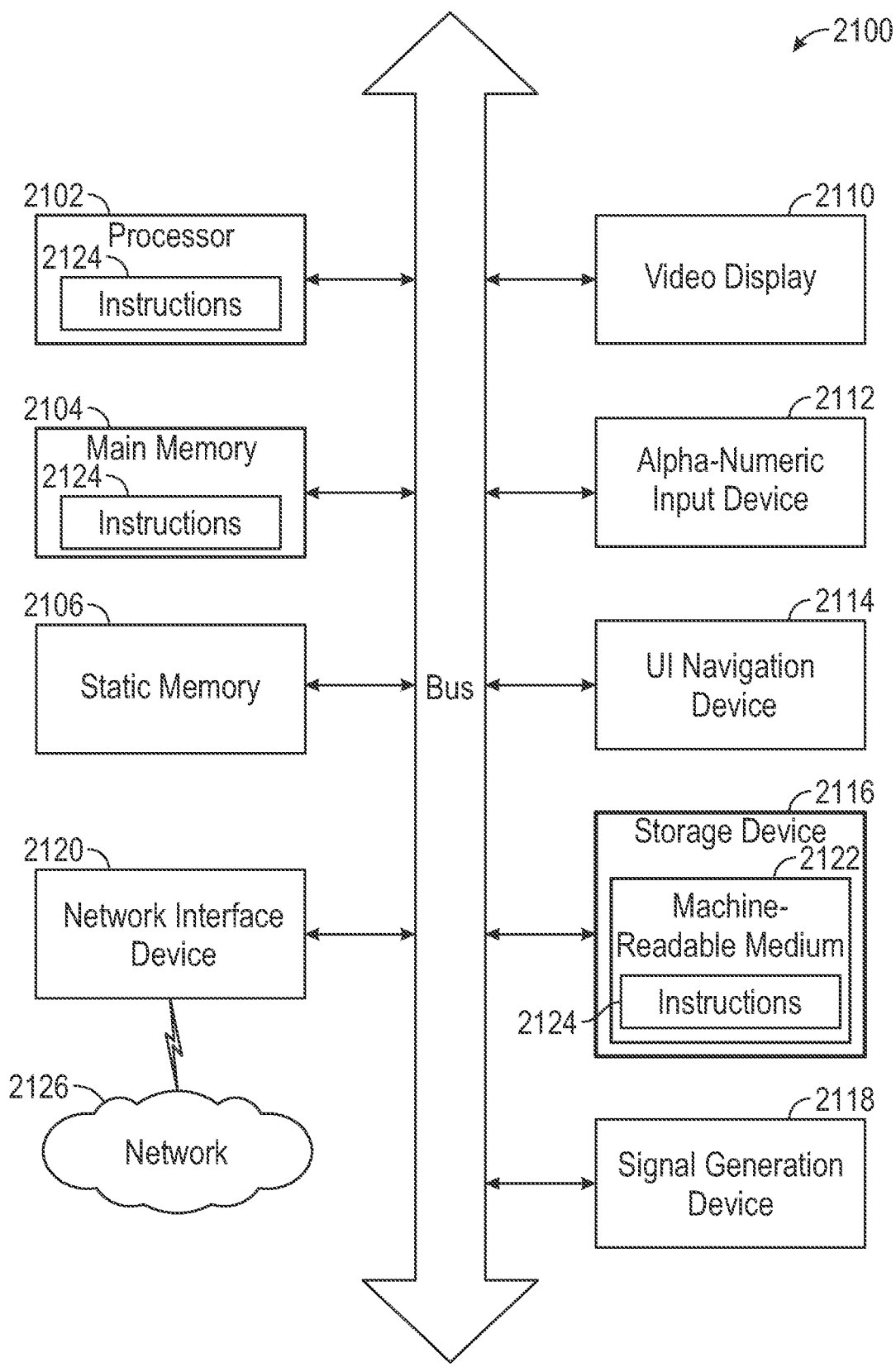
FIG. 21 is a block diagram illustrating a computing device hardware architecture.

FIG. 21 is a block diagram illustrating a computing device hardware architecture 2100, within which a set or sequence of instructions can be executed to cause a machine to perform examples of any one of the methodologies discussed herein. The hardware architecture 2100 describes a computing device for executing one or more of the user interfaces, described herein.

The architecture 2100 may operate as a standalone device or may be connected (e.g., networked) to other machines. In a networked deployment, the architecture 2100 may operate in the capacity of either a server or a client machine in server-client network environments, or it may act as a peer machine in peer-to-peer (or distributed) network environments. The architecture 2100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

In some of the disclosed embodiments, the mobile device application discussed above is stored as instructions 2124, discussed below. The instructions 2124 configure the hardware processor 2102 to perform functions discussed above as attributed to the mobile device application. For example, the instructions 2124 configure the hardware processor 2102 to display one or more of the user interfaces, or any portion of the one or more user interfaces discussed above with respect to FIGS. 1-17. The mobile device application is in communication with one or more servers (e.g. via a computer network) in at least some of the disclosed embodiments. The one or more servers also implement, in at least some embodiments, the example architecture 2100. The one or more servers provide back-end operations to support the user interfaces discussed above as needed. For example, the servers are configured to store and retrieve any data necessary to implement the above described user interfaces, and to provide features such as itinerary search, status information, and the like.

The example architecture 2100 includes a processor unit 2102 comprising at least one processor (e.g., a central processing unit (CPU), a graphics processing unit (GPU), or both, processor cores, compute nodes). The architecture 2100 may include one or more hardware memories. The one or more hardware memories include a main memory 2104 and a static memory 2106, which communicate with each other via a link 2108 (e.g., bus). The architecture 2100 can further include a video display unit 2110, an input device 2112 (e.g., a keyboard), and a UI navigation device 2114 (e.g., a mouse). In some examples, the video display unit 2110, input device 2112, and UI navigation device 2114 are incorporated into a touchscreen display. The architecture 2100 may additionally include a storage device 2116 (e.g., a drive unit), a signal generation device 2118 (e.g., a speaker), a network interface device 2120, and one or more sensors (not shown), such as a Global Positioning System (GPS) sensor, compass, accelerometer, or other sensor.

In some examples, the processor unit 2102 or another suitable hardware component may support a hardware interrupt. In response to a hardware interrupt, the processor unit 2102 may pause its processing and execute an ISR, for example, as described herein.

The storage device 2116 includes a non-transitory computer readable storage medium or machine-readable medium 2122 on which is stored one or more sets of data structures and instructions 2124 (e.g., software) embodying or used by any one or more of the methodologies or functions described herein. The instructions 2124 can also reside, completely or at least partially, within the main memory 2104, within the static memory 2106, and/or within the processor unit 2102 during execution thereof by the architecture 2100, with the main memory 2104, the static memory 2106, and the processor unit 2102 also constituting machine-readable media.

Executable Instructions and Machine-Storage Medium

The various memories (i.e., 2104, 2106, and/or memory of the processor unit(s) 2102) and/or storage device 2116 may store one or more sets of instructions and data structures (e.g., instructions) 2124 embodying or used by any one or more of the methodologies or functions described herein. These instructions, when executed by processor unit(s) 2102 cause various operations to implement the disclosed examples.

As used herein, the terms "machine-storage medium," "device-storage medium," "computer-storage medium" (referred to collectively as "machine-storage medium 2122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 2122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 2122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 2124 can further be transmitted or received over a communications network 2126 using a transmission medium via the network interface device 2120 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Example 1 is a method, comprising: displaying, within a mobile device application, a first user interface, the first user interface configured to receive booking information for a multi-modal transportation service, the multi-modal transportation service including at least two travel legs using different travel modalities; detecting that a start time for the multi-modal transportation service is within a threshold time of a current time; and displaying, within the mobile device application and in response to the detection, a second user interface, the second user interface displaying travel status information for the multi-modal transportation service.

In Example 2, the subject matter of Example 1 optionally includes wherein the second user interface is configured to display a trip modality indicator, the trip modality indicator including separate indicators for each of the at least two travel legs of the multi-modal transportation service having different travel modalities.

In Example 3, the subject matter of any one or more of Examples 1-2 optionally include wherein a first travel modality of the different travel modalities is one of walking or a ground-based vehicle, and a second travel modality of the different travel modalities is an aerial vehicle.

In Example 4, the subject matter of any one or more of Examples 1-3 optionally include wherein displaying the second user interface comprises displaying the second user interface as a full screen interface on a mobile device.

In Example 5, the subject matter of any one or more of Examples 1-4 optionally include wherein the second user interface displays a map, and indicates on the map, one or more of a current location of a traveler on the multi-modal transportation service, a pick-up location for the travel for a particular leg of the multi-modal transportation service, a route of travel of the particular leg of the multi-modal transportation service, or a destination location of the particular leg of the multi-modal transportation service.

In Example 6, the subject matter of any one or more of Examples 1-5 optionally include wherein the second user interface displays a graphical trip status indicator, the graphical trip status indicator including separate indicators for a plurality of activities of the multi-modal transportation service, with one of the separate indicators being visually distinct from other of the separate indicators, the one separate indicator representing a current activity of the multi-modal transportation service.

In Example 7, the subject matter of any one or more of Examples 1-6 optionally include wherein the first user interface is configured to receive input defining a requested arrival time at a final destination of the multi-modal transportation service, the method further comprising requesting a search for multi-modal itineraries that provide for a trip arrival time based on the requested arrival time at the final destination.

In Example 8, the subject matter of Example 7 optionally includes requesting a search for multi-modal itineraries that provide trip arrival times closest to the requested arrival time at the final destination, receiving a response to the request, the response including a list of multi-modal itineraries, and displaying the list of multi-modal itineraries on the first user interface.

In Example 9, the subject matter of any one or more of Examples 7-8 optionally include selecting multi-modal itineraries from the search for display based on arrival times of the multi-modal itineraries, cost of the multi-modal itineraries, elapsed times of the multi-modal itineraries, and a number of legs included in each of the multi-modal itineraries.

Example 10 is a non-transitory computer readable storage medium comprising instructions that when executed configure hardware processing circuitry to perform operations comprising: displaying, within a mobile device application, a first user interface, the first user interface configured to receive booking information for a multi-modal transportation service, the multi-modal transportation service including at least two travel legs using different travel modalities; detecting that a start time for the multi-modal transportation service is within a threshold time of a current time; and displaying, within the mobile device application and in response to the detection, a second user interface, the second user interface displaying travel status information for the multi-modal transportation service.

In Example 11, the subject matter of Example 10 optionally includes wherein the second user interface is configured to display a trip modality indicator, the trip modality indicator including separate indicators for each of the at least two travel legs of the multi-modal transportation service having different travel modalities.

In Example 12, the subject matter of any one or more of Examples 10-11 optionally include wherein a first travel modality of the different travel modalities is one of walking or a ground-based vehicle, and a second travel modality of the different travel modalities is an aerial vehicle.

In Example 13, the subject matter of any one or more of Examples 10-12 optionally include wherein displaying the second user interface comprises displaying the second user interface as a full screen interface on a mobile device.

In Example 14, the subject matter of any one or more of Examples 10-13 optionally include wherein the second user interface displays a map, and indicates on the map, one or more of a current location of a traveler on the multi-modal transportation service, a pick-up location for the travel for a particular leg of the multi-modal transportation service, a route of travel of the particular leg of the multi-modal transportation service, or a destination location of the particular leg of the multi-modal transportation service.

In Example 15, the subject matter of any one or more of Examples 10-14 optionally include wherein the second user interface displays a graphical trip status indicator, the graphical trip status indicator including separate indicators for a plurality of activities of the multi-modal transportation service, with one of the separate indicators being visually distinct from other of the separate indicators, the one separate indicator representing a current activity of the multi-modal transportation service.

In Example 16, the subject matter of any one or more of Examples 10-15 optionally include wherein the first user interface is configured to receive input defining a requested arrival time at a final destination of the multi-modal transportation service, the operations further comprising requesting a search for multi-modal itineraries that provide for a trip arrival time based on the requested arrival time at the final destination.

In Example 17, the subject matter of Example 16 optionally includes the operations further comprising requesting a search for multi-modal itineraries that provide trip arrival times closest to the requested arrival time at the final destination, and displaying multi-modal itineraries resulting from the search on the first user interface.

In Example 18, the subject matter of any one or more of Examples 16-17 optionally include the operations further comprising selecting multi-modal itineraries from the search for display based on arrival times of the multi-modal itineraries, cost of the multi-modal itineraries, elapsed times of the multi-modal itineraries, and a number of legs included in each of the multi-modal itineraries.

Example 19 is a system, comprising: hardware processing circuitry; one or more hardware memories storing instructions that when executed configure the hardware processing circuitry to perform operations comprising: displaying, within a mobile device application, a first user interface, the first user interface configured to receive booking information for a multi-modal transportation service, the multi-modal transportation service including at least two travel legs using different travel modalities; detecting that a start time for the multi-modal transportation service is within a threshold time of a current time; and displaying, within the mobile device application and in response to the detection, a second user interface, the second user interface displaying travel status information for the multi-modal transportation service.

In Example 20, the subject matter of Example 19 optionally includes wherein the second user interface is configured to display a trip modality indicator, the trip modality indicator including separate indicators for each of the at least two travel legs of the multi-modal transportation service having different travel modalities.

In Example 21, the subject matter of any one or more of Examples 19-20 optionally include wherein a first travel modality of the different travel modalities is one of walking or a ground-based vehicle, and a second travel modality of the different travel modalities is an aerial vehicle.

In Example 22, the subject matter of any one or more of Examples 19-21 optionally include wherein displaying the second user interface comprises displaying the second user interface as a full screen interface on a mobile device.

In Example 23, the subject matter of any one or more of Examples 19-22 optionally include wherein the second user interface displays a map, and indicates on the map, one or more of a current location of a traveler on the multi-modal transportation service, a pick-up location for the travel for a particular leg of the multi-modal transportation service, a route of travel of the particular leg of the multi-modal transportation service, or a destination location of the particular leg of the multi-modal transportation service.

In Example 24, the subject matter of any one or more of Examples 19-23 optionally include wherein the second user interface displays a graphical trip status indicator, the graphical trip status indicator including separate indicators for a plurality of activities of the multi-modal transportation service, with one of the separate indicators being visually distinct from other of the separate indicators, the one separate indicator representing a current activity of the multi-modal transportation service.

In Example 25, the subject matter of any one or more of Examples 19-24 optionally include wherein the first user interface is configured to receive input defining a requested arrival time at a final destination of the multi-modal transportation service, the operations further comprising requesting a search for multi-modal itineraries that provide for a trip arrival time based on the requested arrival time at the final destination.

In Example 26, the subject matter of Example 25 optionally includes requesting a search for multi-modal itineraries that provide trip arrival times closest to the requested arrival time at the final destination, and displaying multi-modal itineraries resulting from the search on the first user interface.

In Example 27, the subject matter of any one or more of Examples 25-26 optionally include selecting multi-modal itineraries from the search for display based on arrival times of the multi-modal itineraries, cost of the multi-modal itineraries, elapsed times of the multi-modal itineraries, and a number of legs included in each of the multi-modal itineraries.

The invention claimed is:

1. A method performed by hardware processing circuitry, comprising:
receiving, by a server from a mobile device application operating in a booking mode, booking information for a multi-modal transportation service, the multi-modal transportation service including at least two travel legs using different travel modalities;
detecting, by the server, that a start time for the multi-modal transportation service is within a threshold time of a current time; and
in response to the detecting, instructing, by the server, the mobile device application to transition from the booking mode to a status mode to display travel status information for the multi-modal transportation service.

2. The method of claim 1, wherein the status mode configured to display a trip modality indicator, the trip modality indicator including separate indicators for each of the at least two travel legs of the multi-modal transportation service having different travel modalities.

3. The method of claim 1, wherein the status mode configured to display a map and one or more of a current location of a traveler on the multi-modal transportation service, a pick-up location for travel for a leg of the multi-modal transportation service, a route of travel of the leg of the multi-modal transportation service, or a destination location of the leg of the multi-modal transportation service.

4. The method of claim 1, wherein the status mode configured to display a graphical trip status indicator, the graphical trip status indicator including separate indicators for a plurality of activities of the multi-modal transportation service, with one of the separate indicators being visually distinct from other of the separate indicators, the visually distinct separate indicator representing a current activity of the multi-modal transportation service.

5. A non-transitory computer readable storage medium comprising instructions that when executed configure hardware processing circuitry to perform operations comprising:
receiving, by a server from a mobile device application operating in a booking mode, booking information for a multi-modal transportation service, the multi-modal transportation service including at least two travel legs using different travel modalities;
detecting, by the server, that a start time for the multi-modal transportation service is within a threshold time of a current time; and
in response to the detecting, instructing, by the server, the mobile device application to transition from the booking mode to a status mode to display travel status information for the multi-modal transportation service.

6. The non-transitory computer readable storage medium of claim 5, wherein the status mode configured to display a trip modality indicator, the trip modality indicator including separate indicators for each of the at least two travel legs of the multi-modal transportation service having different travel modalities.

7. The non-transitory computer readable storage medium of claim 5, wherein the status mode configured to display a map and one or more of a current location of a traveler on the multi-modal transportation service, a pick-up location for travel for a leg of the multi-modal transportation service, a route of travel of the leg of the multi-modal transportation service, or a destination location of the leg of the multi-modal transportation service.

8. The non-transitory computer readable storage medium of claim 5, wherein the status mode configured to display a graphical trip status indicator, the graphical trip status indicator including separate indicators for a plurality of activities of the multi-modal transportation service, with one of the separate indicators being visually distinct from other of the separate indicators, the visually distinct separate indicator representing a current activity of the multi-modal transportation service.

9. The non-transitory computer readable storage medium of claim 5, wherein the booking mode configured to receive input defining a requested arrival time at a final destination of the multi-modal transportation service, the operations further comprising requesting a search for multi-modal itineraries that provide for a trip arrival time based on the requested arrival time at the final destination.

10. The non-transitory computer readable storage medium of claim 9, the operations further comprising receiving results of the search for multi-modal itineraries that provide trip arrival times closest to the requested arrival time at the final destination, and instructing the mobile device application to display multi-modal itineraries resulting from the search.

11. The non-transitory computer readable storage medium of claim 9, the operations further comprising selecting multi-modal itineraries from the search for display based on arrival times of the multi-modal itineraries, cost of the multi-modal itineraries, elapsed times of the multi-modal itineraries, or a number of legs included in each of the multi-modal itineraries.

12. A system, comprising:
hardware processing circuitry; and
one or more hardware memories storing instructions that when executed configure the hardware processing circuitry to perform operations comprising:

receiving, by a server from a mobile device application operating in a booking mode, booking information for a multi-modal transportation service, the multi-modal transportation service including at least two travel legs using different travel modalities;

detecting, by the server, that a start time for the multi-modal transportation service is within a threshold time of a current time; and in response to the detecting, instructing, by the server, the mobile device application to transition from the booking mode to a status mode to display travel status information for the multi-modal transportation service.

13. The system of claim 12, wherein the status mode configured to display a trip modality indicator, the trip modality indicator including separate indicators for each of the at least two travel legs of the multi-modal transportation service having different travel modalities.

14. The system of claim 12, wherein a first travel modality of the different travel modalities is one of walking or a ground-based vehicle, and a second travel modality of the different travel modalities is an aerial vehicle.

15. The system of claim 12, wherein the status mode is displayed as a full screen interface on the mobile device application.

16. The system of claim 12, wherein the status mode configured to display a map and one or more of a current location of a traveler on the multi-modal transportation service, a pick-up location for travel for a leg of the multi-modal transportation service, a route of travel of the leg of the multi-modal transportation service, or a destination location of the leg of the multi-modal transportation service.

17. The system of claim 12, wherein the status mode that displays a graphical trip status indicator, the graphical trip status indicator including separate indicators for a plurality of activities of the multi-modal transportation service, with one of the separate indicators being visually distinct from other of the separate indicators, the visually distinct separate indicator representing a current activity of the multi-modal transportation service.

18. The system of claim 12, wherein the booking mode configured to receive input defining a requested arrival time at a final destination of the multi-modal transportation service, the operations further comprising requesting a search for multi-modal itineraries that provide for a trip arrival time based on the requested arrival time at the final destination.

19. The system of claim 18, further comprising receiving results of the search for multi-modal itineraries that provide trip arrival times closest to the requested arrival time at the final destination, and instructing the mobile device application to display multi-modal itineraries resulting from the search.

20. The system of claim 18, further comprising selecting multi-modal itineraries from the search for display based on arrival times of the multi-modal itineraries, cost of the multi-modal itineraries, elapsed times of the multi-modal itineraries, or a number of legs included in each of the multi-modal itineraries.

* * * * *